United States Patent
Noumura et al.

(10) Patent No.: US 9,067,604 B2
(45) Date of Patent: Jun. 30, 2015

(54) CONTROL DEVICE FOR VEHICLE

(75) Inventors: Shin Noumura, Susono (JP); Kaiji Itabashi, Susono (JP); Ken Koibuchi, Hadano (JP); Toshio Tanahashi, Susono (JP); Keisuke Takeuchi, Susono (JP); Hiroyuki Hanamura, Gotenba (JP); Yoji Takanami, Anjyo (JP); Norimi Asahara, Numadu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 337 days.

(21) Appl. No.: 13/389,447

(22) PCT Filed: Aug. 17, 2010

(86) PCT No.: PCT/IB2010/002022
§ 371 (c)(1),
(2), (4) Date: Mar. 2, 2012

(87) PCT Pub. No.: WO2011/021089
PCT Pub. Date: Feb. 24, 2011

(65) Prior Publication Data
US 2012/0179342 A1    Jul. 12, 2012

(30) Foreign Application Priority Data

Aug. 18, 2009 (JP) .................................. 2009-189499
Mar. 12, 2010 (JP) .................................. 2010-056595

(51) Int. Cl.
| | | |
|---|---|---|
| G06F 7/00 | (2006.01) | |
| G06F 17/00 | (2006.01) | |
| G06F 19/00 | (2011.01) | |
| B60W 50/10 | (2012.01) | |

(Continued)

(52) U.S. Cl.
CPC ........ B60W 50/10 (2013.01); B60K 6/36 (2013.01); B60W 10/04 (2013.01); B60W 10/06 (2013.01); B60W 10/10 (2013.01); B60W 10/18 (2013.01); B60W 10/22 (2013.01); B60W 30/188 (2013.01); B60W 40/09 (2013.01); B60W 2520/10 (2013.01); B60W 2520/105 (2013.01); B60W 2520/125 (2013.01)

(58) Field of Classification Search
CPC .................................. B60W 10/04; B60K 6/36
USPC ................................................................. 701/54
See application file for complete search history.

(56) References Cited

U.S. PATENT DOCUMENTS 5,483,446 A * 1/1996 Momose et al. ................... 701/1
5,895,435 A * 4/1999 Ohta et al. ....................... 701/59

(Continued)

FOREIGN PATENT DOCUMENTS

| JP | A-06-249007 | 9/1994 |
| JP | A-10-016605 | 1/1998 |

(Continued)

*Primary Examiner* — Khoi Tran
*Assistant Examiner* — Harry Oh
(74) *Attorney, Agent, or Firm* — Oliff PLC

(57) ABSTRACT

In a control device for a vehicle that controls a revolution speed of a drive power source or a gear ratio of a transmission coupled to an output side of the drive power source in the vehicle equipped with the drive power source and the transmission, the control device is configured to determine an index that is based on a running state of the vehicle, and to control a required revolution speed of the drive power source or a required gear ratio for the transmission on the basis of the index.

9 Claims, 14 Drawing Sheets

(51) Int. Cl.
*B60W 10/06* (2006.01)
*B60W 10/10* (2012.01)
*B60W 10/18* (2012.01)
*B60W 10/22* (2006.01)
*B60W 30/188* (2012.01)
*B60W 40/09* (2012.01)
*B60K 6/36* (2007.10)
*B60W 10/04* (2006.01)

(56) References Cited

U.S. PATENT DOCUMENTS

| | | | | |
|---|---|---|---|---|
| 5,941,793 | A * | 8/1999 | Ito et al. | 477/120 |
| 7,011,602 | B2 * | 3/2006 | Makiyama et al. | 477/44 |
| 2004/0128048 | A1 * | 7/2004 | Iwatuki et al. | 701/54 |
| 2005/0027402 | A1 | 2/2005 | Koibuchi et al. | |
| 2007/0150118 | A1 | 6/2007 | Takamatsu et al. | |
| 2008/0097674 | A1 * | 4/2008 | Kuwahara et al. | 701/51 |
| 2009/0088918 | A1 * | 4/2009 | Takenaka et al. | 701/29 |
| 2009/0099727 | A1 * | 4/2009 | Ghoneim | 701/36 |

FOREIGN PATENT DOCUMENTS

| | | |
|---|---|---|
| JP | A-10-77893 | 3/1998 |
| JP | A-10-269499 | 10/1998 |
| JP | A-2000-35118 | 2/2000 |
| JP | A-2007-137278 | 6/2007 |
| JP | A-2009-85291 | 4/2009 |
| RU | 2 338 653 C2 | 11/2008 |
| WO | WO 2007/107363 A1 | 9/2007 |

* cited by examiner

F I G . 9
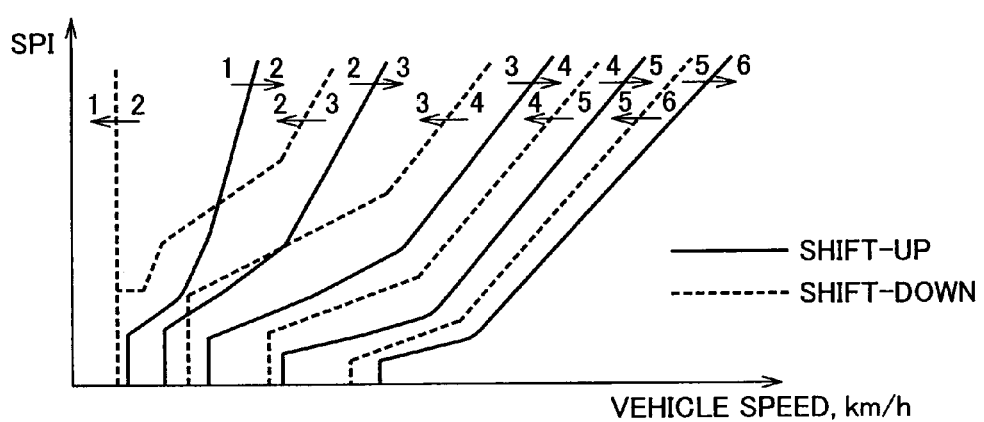

CONTROL DEVICE FOR VEHICLE

BACKGROUND OF THE INVENTION

1. Field of the Invention

The invention relates to a vehicle control system that is configured to control behavior characteristics or acceleration/deceleration characteristics (which will be called "running characteristics") of the vehicle, such as a power characteristic, steering characteristic and a suspension characteristic of the vehicle, so that the running characteristics match a running environment and driver's preferences and intention regarding running.

2. Description of the Related Art

While the vehicle behavior, such as a vehicle speed and a running direction, varies according to the driver's accelerating/decelerating operation and steering operation, the relationship between the amount of the driver's operation and the amount of change of the behavior is determined not only by the energy efficiency, such as a fuel efficiency, but also by characteristics, such as a ride comfort, quietness and power performance, which are required of the vehicle. In the meantime, environments in which the vehicle runs include a wide variety of surroundings or road types, such as an urban area, an expressway, a winding road, an uphill, and a downhill, and there are a variety of driver's preferences and intentions regarding running, and there are a variety of impressions the driver receives from the vehicle during running. Therefore, an expected running characteristic is not necessarily obtained if the running environment changes or the vehicle is driven by another driver. As a result, so-called driveability may deteriorate. Thus, one type of vehicle has been developed which is arranged to manually select running characteristics, such as a power output characteristic (or acceleration characteristic) and a suspension characteristic, concerning the behavior of the vehicle, by operating a mode selection switch. Namely, the vehicle is arranged to manually select a drive mode from, for example, a sporty mode in which the vehicle runs with an excellent accelerating ability, and the suspension is set to be somewhat hard, a normal mode in which the vehicle accelerates at a relatively low rate, and has a relatively soft suspension characteristic, and an eco mode in which the fuel economy or efficiency is prioritized, by operating the switch.

Also, various systems have been proposed which are configured to cause the driving orientation to be reflected by behavior control of the vehicle. This type of system does not necessitate any switching operation, and permits changes of subtle or detailed characteristics. For example, Japanese Patent Application Publication No. 06-249007 (JP-A-06-249007) describes a drive power control device using a neuro-computer configured to learn the relationship between an accelerator stroke and an acceleration corresponding to a vehicle speed as a required acceleration model and calculate the accelerator depression amount on the basis of a difference between this model and a second standard acceleration model reflecting the driver's intention and a difference between the second standard acceleration model and a reference first standard acceleration model.

The technology described in JP-A-06-249007 is a technology for causing the driver's preferences and driver's intention to be more accurately reflected by the driving performance and driving characteristics of the vehicle. However, the technology leaves room for improvement.

This invention provides a control device for a vehicle that can better adapt the dynamic performance or driving characteristics of the vehicle to driver's intention.

SUMMARY OF INVENTION

The first aspect of the invention relates to a control device for a vehicle. The control device controls a revolution speed of a drive power source or a gear ratio of a transmission coupled to an output side of the drive power source in the vehicle equipped with the drive power source and the transmission. The control device is configured to determine an index that is based on a running state of the vehicle, which is in accordance with driver's intention, and to control a required revolution speed of the drive power source, or a required gear ratio for the transmission on the basis of the index.

The required revolution speed or the required gear ratio may be established in advance according to a speed of the vehicle and the index.

The index may be determined on the basis of at least one of a longitudinal acceleration and a lateral acceleration of the vehicle.

A required maximum acceleration ratio that is established in advance according to the index may be determined on the basis of the index, a required acceleration for each vehicle speed may be determined on the basis of a maximum generated acceleration and the required maximum acceleration ratio for each vehicle speed, and the required revolution speed or the required gear ratio may be set on the basis of the required acceleration.

In accordance with the invention, the required acceleration can be generated in response to the vehicle speed. Therefore, the vehicle can be easily run as intended by the driver at both high and low vehicle speeds.

A required maximum acceleration ratio that is established in advance according to the index may be determined on the basis of the index, a required acceleration may be determined on the basis of a maximum generated acceleration and the required maximum acceleration ratio at a point in time at which the index is determined, and the required revolution speed or the required gear ratio may be maintained at a value at which this required acceleration is attained.

In accordance with the invention, the required revolution speed or required gear ratio that has once been set is maintained. Therefore, high dynamic performance and driving characteristics can be obtained in accordance with the driver's intention.

A required maximum acceleration ratio that is established in advance according to the index may be determined on the basis of the index, and when the index is larger than a predetermined value, a required acceleration may be determined on the basis of a maximum generated acceleration and the required maximum acceleration ratio at a point in time at which the index is determined, and the required revolution speed or the required gear ratio may be maintained at a value at which this required acceleration is attained.

In accordance with the invention, a required revolution speed or required gear ratio is controlled according to the index. Therefore, dynamic performance and driving characteristics that are neither excessive nor insufficient can be obtained in accordance with the driver's intention.

A driving requirement amount for the vehicle may be determined, and a target revolution speed of the drive power source or a target gear ratio of the transmission may be further determined on the basis of the driving requirement amount, and the drive power source may be controlled to have either the required revolution speed or the target revolution speed whichever is higher, or the transmission may be controlled to have either the required gear ratio or the target gear ratio whichever is higher.

A variation rate of the revolution speed of the drive power source in a case in which the target revolution speed exceeds the required revolution speed, or a variation rate of the gear ratio in a case in which the target gear ratio exceeds the required gear ratio is made different depending on the index.

When the index based on the running state of the vehicle is relatively large, the variation rate of the revolution speed or the variation rate of the gear ratio may be higher than when the index is relatively small.

With the control device for a vehicle, when the vehicle turns, a variation of the required revolution speed or the required gear ratio is suppressed compared with a case in which the vehicle does not turn.

The second aspect of the invention relates to a control method for a vehicle. With this control method, a revolution speed of a drive power source or a gear ratio of a transmission coupled to an output side of the drive power source is controlled in the vehicle equipped with the drive power source and the transmission. The control method includes determining an index that is based on a running state of the vehicle, and controlling a required revolution speed of the drive power source or a required gear ratio for the transmission on the basis of the index.

In accordance with the invention, agility of the vehicle characteristics that is in accordance of the driver's intention is determined on the basis of the index, and the required revolution speed of the drive power source or the required gear ratio for the transmission is controlled on the basis of the index. The dynamic performance or driving characteristics adapted to the driver's intention can be set.

Further, in accordance with the invention, since the driving requirement amount represented by an accelerator pedal operation performed by the driver is also reflected, in addition to the index that is in accordance with the driver's intention, in the revolution speed of the power source or the gear ratio of the transmission, the vehicle can run in response to the driver's driving requirement. Moreover, when the index is large, the driver's driving requirement is rapidly met. In this respect, the driver can be also prevented from getting a feeling of discomfort.

BRIEF DESCRIPTION OF DRAWINGS

The foregoing and further features and advantages of the invention will become apparent from the following description of preferred embodiments with reference to the accompanying drawings, wherein like numerals are used to represent like elements and wherein:

FIG. 9 is a diagram illustrating an example of an acceleration map that can be used when the shift stage is set by the vehicle and indication SPI;

DETAILED DESCRIPTION OF THE EMBODIMENTS

Figure 15:
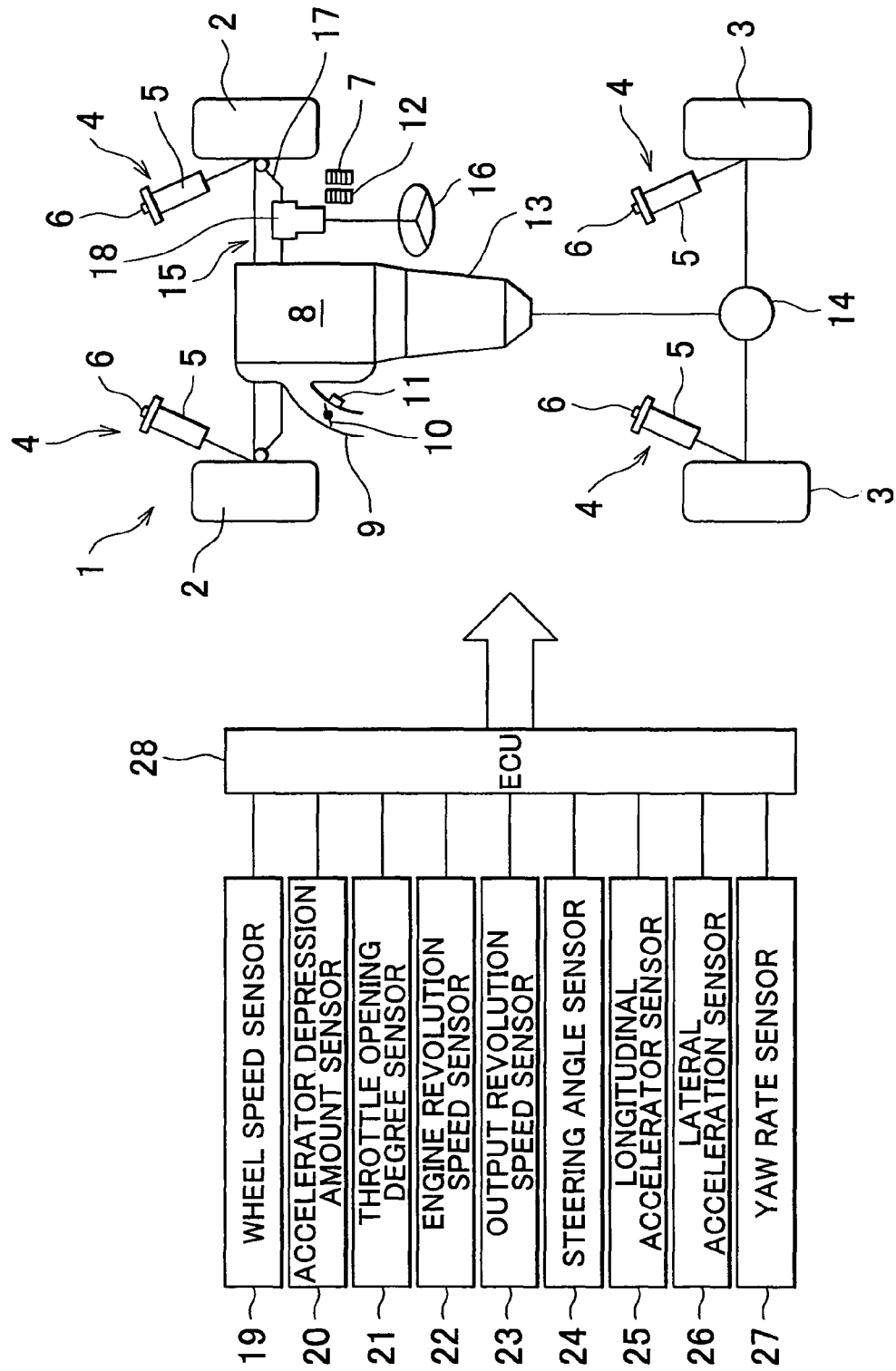
FIG. 15 shows schematically a vehicle that can be an object of control in accordance with the invention.

The invention will be described below in greater detail. A vehicle that is the object of control in accordance with the invention is caused to accelerate, decelerate, or turn by the driver's operations, and an automobile having an internal combustion engine or an electric motor as a drive power source is a representative example of such a vehicle. An example thereof is shown in a block diagram in FIG. 15. A vehicle 1 shown herein has a total of four wheels: two front wheels 2 that are steered wheels and two rear wheels 3 that are driven wheels, and these four wheels 2 and 3 are mounted on a vehicle body (not shown in the figure) by respective suspensions 4. Similarly to the generally available suspension, the suspension 4 is constituted mainly by a spring and a shock absorber (damper). In FIG. 15, shock absorbers 5 of the suspension are shown. The shock absorbers 5 shown herein are configured to generate a buffer action by using a flow resistance of a fluid such as gas or liquid and also configured such that the value of the flow resistance can be changed by an actuator such as an electric motor 6. Thus, when the flow resistance is increased, the vehicle body does not sink down easily, the so-called rigid feel is created, a feeling of comfort is diminished and a sporty feel is enhanced as the running characteristics of the vehicle. A configuration can be also used in which the vehicle height is adjusted by supplying pressurized gas into the shock absorbers 5 or discharging the gas therefrom.

Each of the front and rear wheels 2 and 3 is provided with a brake device (not shown in the figure) configured to apply a brake force to the front and rear wheels 2 and 3 when a driver operates the brake device by stepping on a brake pedal 7 disposed at the driver's seat.

A drive power source of the vehicle 1 has a conventional configuration such as an internal combustion engine, an electric motor, or a combination thereof. FIG. 15 shows an example in which an internal combustion engine (engine) 8 is installed. A throttle valve 10 for controlling the amount of intake air is disposed in an intake pipe 9 of the engine 8. The throttle valve 10 has a configuration called an electronic throttle valve. Such valve is opened and closed by an electronically controlled actuator 11 such as an electric motor and the opening degree of the valve can be adjusted. The actuator 11 is configured such that the throttle valve 10 is adjusted to a predetermined opening degree (throttle opening degree) according to a step-on amount, that is, an accelerator depression amount, of an accelerator pedal 12 disposed at the driver's seat.

The relationship between the accelerator depression amount and the throttle opening degree can be set appropriately, and as this relationship becomes close to a one-to-one relationship, the so-called direct feeling, is enhanced and the vehicle behavior characteristic has a sporty feel. Conversely, where the characteristics are set such that the throttle opening degree becomes small relative to the accelerator depression amount, the vehicle behavior characteristic or acceleration characteristic has the so-called mild feel. When an electric motor is used as a drive power source, an electronic controller such as an inverter or a converter is provided instead of the throttle valve 10, the electric current of the electric controller is adjusted according to the accelerator depression amount, and the relationship between the amount of electric current and accelerator depression amount, that is, the behavior characteristic or acceleration characteristic, are changed appropriately. An example of the case in which "the relationship becomes close to a one-to-one relationship" as referred to hereinabove is a case in which the direction and amount of variation rate of the accelerator depression amount are substantially equal to those of the throttle opening degree.

A transmission 13 is coupled to an output side of the engine 8. The transmission 13 is configured to change appropriately a ratio of an input revolution speed and an output revolution speed, that is, a gear ratio, and is for example a conventional transmission such as a multi-stage automatic transmission, a belt-type continuously variable transmission, or a toroidal continuously variable transmission. Accordingly, the transmission 13 is provided with an actuator (not shown in the figure) and configured such that the gear ratio is varied in a step-like (stepwise) manner or continuously by appropriately controlling the actuator. More specifically, a shift map in which a gear ratio is determined according to a vehicle state such as vehicle speed or accelerator depression amount is prepared in advance and shift control is performed according to the speed variation map, or a target output is calculated on the basis of a vehicle state such as vehicle speed or accelerator depression amount, a target engine revolution speed is determined from the target output and an optimum fuel consumption line, and shift control is performed to obtain the target engine revolution speed.

A control mode aimed at improving fuel efficiency or a control mode increasing the drive power can be selected for the above-described basic shift control. In the control mode aimed at improving fuel efficiency, upshifting is performed at a low vehicle speed or a gear ratio on a high speed side is used on a low vehicle speed side, whereas in the control increasing the drive power or improving acceleration characteristic, upshifting is performed at a high vehicle speed or a gear ratio on a low speed side is used on a high vehicle speed side. Such control can be performed by switching a shift map, correcting the driving requirement amount, or correcting the calculated gear ratio. If necessary, a transmission mechanism such as a torque converter equipped with a lock-up clutch can be provided between the engine 8 and the transmission 13. The output shaft of the transmission 13 is coupled to the rear wheels 3 via a differential gear 14 which is a final reducer. The expressions "a low vehicle speed (low speed)" and "a high vehicle speed (high speed)" used herein relate to cases in which the vehicle speed is lower and higher than a predetermined vehicle speed, respectively.

A steering mechanism 15 that steers the front wheels 2 will be explained below. The steering mechanism is provided with a steering linkage 17 that transmits the rotation action of a steering wheel 16 to the left and right front wheels 2, and with an assist mechanism 18 that assists the steering angle or steering force of the steering wheel 16. The assist mechanism 18 is provided with an actuator (not shown in the figure) and configured such that the assist amount provided with the actuator can be adjusted.

An antilock brake system (ABS), a traction control system, and a vehicle stability control (VSC) system that conducts unified control of these systems are provided to stabilize the behavior or posture of the vehicle 1 (these systems are not shown in the figures). These systems are generally available and configured such that a brake force applied to the wheels 2 and 3 is reduced or a brake force is applied on the basis of a difference between the vehicle speed and wheel speed and an engine torque is controlled additionally thereto, thereby preventing or inhibiting the lock or slip of the wheels 2 and 3 and stabilizing the vehicle behavior. A navigation system that can obtain data relating to a road or planned route, or a switch for manually selecting a sport mode, a normal mode, and a low-fuel-consumption mode (economy mode) may be also provided, and a four-wheel drive mechanism (4WD) capable of changing the behavior characteristics such as uphill driving performance, acceleration performance, or steering nature may be also provided.

A variety of sensors are provided to obtain data for controlling the above-described engine 8, transmission 13, shock absorbers 5 of the suspensions 4, assist mechanism 18, and the above-described systems that are not shown in the figure. Examples of such sensors include a wheel speed sensor 19 that detects a rotation speed of the front and rear wheels 2 and 3, an accelerator depression amount sensor 20, a throttle opening degree sensor 21, an engine revolution speed sensor 22, an output revolution speed sensor 23 that detects an output revolution speed of the transmission 13, a steering angle sensor 24, a longitudinal accelerator sensor 25 that detects a longitudinal acceleration (Gx), a lateral acceleration sensor 26 that detects an acceleration (lateral acceleration Gy) in the lateral direction (left-right direction), and a yaw rate sensor 27. The acceleration sensors 25 and 26 can be used together with acceleration sensors that are used in vehicle behavior control, such as the antilock brake system (ABS) and vehicle stability control (VSC) system, or can be used together with an acceleration sensor provided for airbag deployment control in a vehicle equipped with an airbag. Further, the longitudinal and lateral accelerations Gx and Gy may be obtained by resolving a detection value detected by one acceleration sensor disposed obliquely at a predetermined angle (for example 45°) with respect to the longitudinal direction of the vehicle on a horizontal plane into a longitudinal acceleration and a lateral acceleration. The longitudinal and lateral accelerations Gx and Gy may be also found by calculations on the basis of the accelerator depression amount, vehicle speed, road load, and steering angle, rather than by detection with the sensor. These sensors 19 to 27 are configured to transmit the detection signals (data) to an electronic control unit (ECU) 28, and the ECU 28 is configured to perform, calculations according to these data and also data and programs that have been stored in advance and output the calculation results as control command signals to the above-described systems or actuators thereof. The composite acceleration is not limited to the acceleration including the acceleration components in a plurality of directions, such as the acceleration including the acceleration component in the longitudinal direction of the vehicle and the acceleration component in the width direction (lateral direction) of the vehicle. The acceleration in only one direction may be employed as the composite acceleration. For example, only the acceleration in the longitudinal direction of the vehicle may be employed as the composite acceleration.

The control device in accordance with the invention is configured to reflect a running state and agility of behavior of the vehicle (these are sometimes described hereinbelow together as a running state) in the vehicle behavior control, in particular in dynamic performance or acceleration characteristic. The running state of the vehicle as referred to herein is a state represented by longitudinal acceleration, lateral acceleration, acceleration of yawing or rolling, or acceleration obtained by combining these accelerations in a plurality of direction. Thus, taking into account that accelerations in a plurality of directions usually occur when the vehicle behavior is returned to the original state under the effect of driving environment such as pavement, or when the vehicle is driven at a target speed or driven in a target direction, the running state of the vehicle will apparently reflect to a certain degree the driving environment or driver's intention. With the foregoing in view, in accordance with the invention, the running state of the vehicle is reflected in the vehicle behavior control, in particular in the dynamic performance or acceleration characteristic.

As described hereinabove, the vehicle behavior includes acceleration performance, steering nature (turning ability), rigidity of support with the suspensions 4 (that is, the degree of bump rebounding and easiness thereof), and the degree of rolling or pitching, and the control device in accordance with the invention changes these behavior characteristics on the basis of the above-described running state. In this case, the running characteristics may be changed by using an acceleration in a certain direction or a composite acceleration as it is, as one example of the above-described running state. However, in order to reduce uncomfortable feeling, an index obtained by correcting the above-mentioned acceleration or composite acceleration may be used.

Sportiness will be explained below as an example of such index. The sportiness index SPI is the index indicating the driver's intention or the running state of the vehicle. The sportiness that can be used in accordance with the invention is an index obtained by combining accelerations (in particular, absolute values thereof) in a plurality of directions, and an acceleration obtained by adding up a longitudinal acceleration Gx and a lateral acceleration Gy as accelerations closely related to the behavior with respect to the running direction is an example of such an index. For example, the index is calculated by an instant $SPI=(Gx^2+Gy^2)^{1/2}$. The "instant SPI" as referred to herein is the so-called physical parameter and means an index that is calculated on the basis of accelerations found in each direction at each instant as the vehicle runs. The expression "at each instant" as referred to herein means each repetition when the detection of acceleration and calculation of the instant SPI on the basis thereof are conducted repeatedly with a predetermined cycle time.

Of the longitudinal acceleration Gx used in the above-indicated equation (1), at least one of the speed-increasing acceleration and speed-decreasing acceleration (i.e., deceleration) may be subjected to a normalization operation or a weighting operation. Thus, in a typical vehicle, the speed-decreasing acceleration is higher than the speed-increasing acceleration, but the difference is practically neither felt nor recognized by the driver and in most cases the speed-decreasing acceleration and speed-increasing acceleration are recognized as substantially equal. The normalization operation serves to correct this difference between the actual value and the driver's feeling and involves increasing the speed-increasing acceleration or decreasing the speed-decreasing acceleration for the longitudinal acceleration Gx. More specifically, in this operation, a ratio of maximum values of respective accelerations is determined and the speed-decreasing or speed-increasing acceleration is multiplied thereby. Also, the weighting operation may be performed to correct the speed-decreasing acceleration relative to the lateral acceleration. Essentially, this operation performs the correction by assigning a weight factor to a value in at least either of the forward and rearward directions, such that the maximum acceleration in each direction is positioned on a circle of a predetermined radius, in the same manner as when a longitudinal drive force and a lateral force that can be generated by tires are represented on a tire friction circle. Therefore, the normalization operation and the weighting operation create a difference in degrees to which the speed-increasing acceleration and speed-decreasing acceleration are reflected in the behavior characteristic. A speed-decreasing longitudinal acceleration and a speed-increasing longitudinal acceleration may be subjected to the weighting operation, as one example of the weighting operation, so that the degree of influence of the speed-increasing longitudinal acceleration is higher than the degree of influence of the speed-decreasing longitudinal acceleration.

Thus, depending on the acceleration direction, there is a discrepancy between the actual value of acceleration and the driver's feeling. For example, apparently there is a discrepancy between the acceleration in the yawing direction or rolling direction and the longitudinal acceleration. Therefore, in accordance with the invention, a configuration can be used such that the degrees by which the accelerations in different directions are reflected in the running characteristic of the vehicle are varied, in other words, the degree of variation of running characteristic based on the acceleration in either of the directions is made different from the degree of variation of running characteristic based on the acceleration in the other direction.

Figure 1:
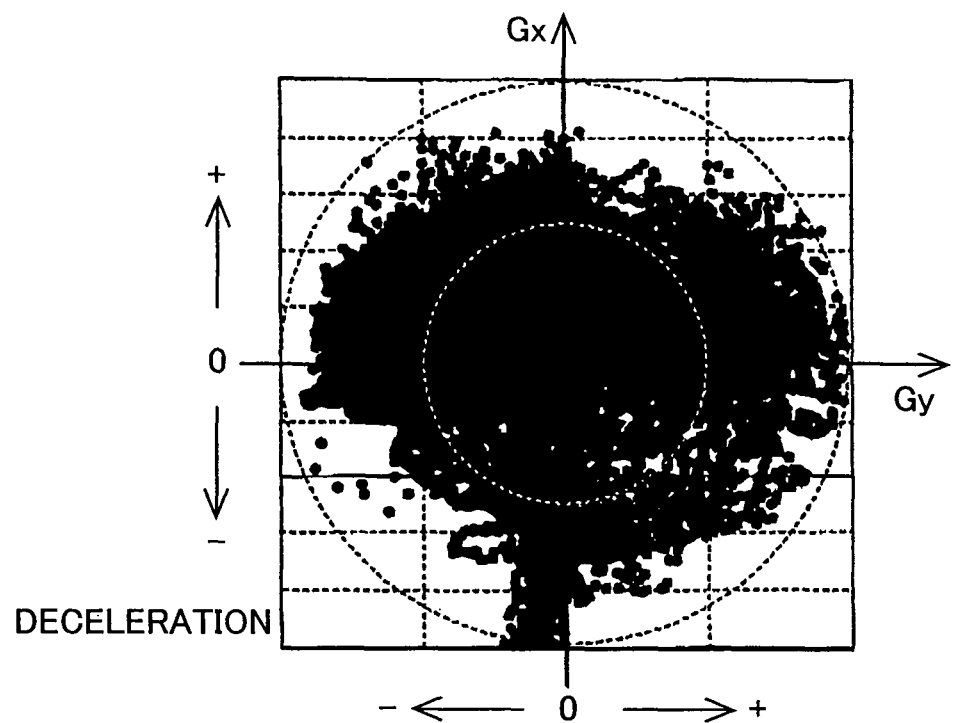
FIG. 1 is a drawing in which the detected values of longitudinal acceleration and lateral acceleration are plotted on a tire friction circle.

FIG. 1 shows an example in which the sensor value of lateral acceleration Gy and the longitudinal acceleration Gx subjected to the above-described normalization operation and the weighting operation are plotted on a tire friction circle. This example relates to a case in which the vehicle is driven on a test course simulating a typical road. As a general tendency, the lateral acceleration Gy is also likely to become large when the vehicle is decelerated by a large degree, and the longitudinal acceleration Gx and the lateral acceleration Gy occur along the tire friction circle.

Figure 2:
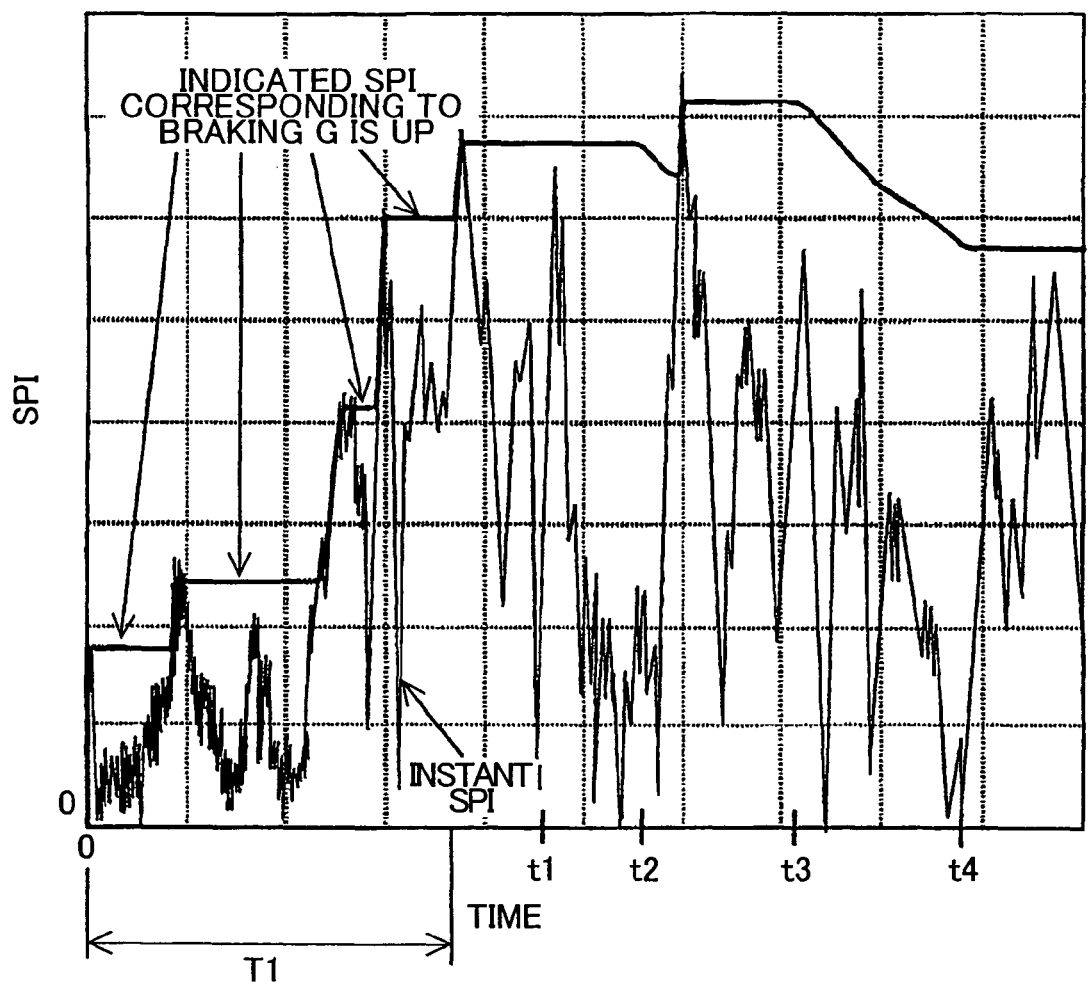
FIG. 2 shows an example of variations of the indication SPI based on the instant SPI.

In accordance with the invention, an indication SPI is determined from the instant SPI. The indication SPI is an index used for the control that changes the running characteristic. This index increases immediately with the increase of the instant SPI, which is the basis for calculation thereof, and decreases slower than the instant SPI. In particular, the indication SPI is constituted to decrease when a predetermined condition is fulfilled. FIG. 2 illustrates variations of the indication SPI determined on the basis of variations of the instant SPI. In the example shown herein, the instant SPI is represented by the values plotted in FIG. 1 described above. By contrast, the indication SPI is constituted to be set to a maximum value of the instant SPI and maintain the previous value till a predetermined condition is fulfilled. Thus, the indication SPI is constituted as an index that changes rapidly when increasing and changes relatively slowly when decreasing.

More specifically, within a time zone T1 after the control has been started in FIG. 2, for example, in the case where the vehicle is decelerating and turning, the instant SPI obtained on the basis of such variations in acceleration increases/decreases, but the instant SPI exceeding the maximum value of the previous cycle occurs before the aforementioned predetermined condition is fulfilled and therefore the indication SPI increases in a stepwise fashion and the increased indication SPI is held. By contrast, at a point in time t2 or a point in time t3, for example, in the case where the vehicle, which has turned and accelerated, starts to run straight and accelerate, the indication SPI decreases because the condition for decrease is fulfilled. Thus, the condition for decreasing the indication SPI is fulfilled when a state where the indication SPI held at the preceding large value is not considered to reflect the driver's intention is assumed. In the invention, the condition is fulfilled when a time interval elapses.

Thus, the state in which the indication SPI held at the preceding large value is not considered to reflect the driver's intention is a state in which the difference between the indication SPI that is being held and the instant SPI that has occurred in this process is comparatively large and the difference continues to be large. Accordingly, the indication SPI is not decreased due to the instant SPI resulting from, for example, the driver's operation of temporarily releasing the accelerator pedal 12, for example, when the vehicle is controlled to turn and accelerate. When a state where the instant SPI resulting from, for example, the driver's operation of continuously releasing the accelerator pedal 12 is less than the held indication SPI continues for a predetermined time interval, for example, when the vehicle gradually decelerates, it is determined that a condition for decreasing the indication SPI is fulfilled. The maintenance time of the state in which the instant SPI is less than the indication SPI can be taken as a start condition for decreasing the indication SPI. Further, in order to reflect the actual running state more accurately in the indication SPI, a start condition for decreasing the indication SPI can be taken as a point in time at which a time integral value (or accumulated value) of the difference between the held indication SPI and instant SPI attains a predetermined threshold value. The threshold value may be set appropriately by conducting tests or simulation. Where the time integral value of the difference in the latter approach is used, the indication SPI is decreased by taking into account the difference between the indication SPI and instant SPI and time. Therefore, it is possible to conduct change control of the behavior characteristic that reflects the actual running state or behavior more accurately.

In the example shown in FIG. 2, the holding time of the indication SPI till the aforementioned point in time t2 is reached is longer than the holding time of the indication SPI till the point in time t3 is reached, but this is because of a configuration enabling the below-described control. Thus, at the end of the aforementioned time zone T1, the indication SPI is increased to and held at a predetermined value. Then, the instant SPI increases at the point in time t1 before the aforementioned decrease start condition is fulfilled and the difference between the increased instant SPI and the indication SPI that has been held becomes equal to or less than a predetermined value that has been set in advance. This predetermined value may be appropriately set by conducting tests or simulation, or with consideration for an instant SPI calculation error. When the instant SPI comes close to the indication SPI that is being held, it means that an acceleration/deceleration state and/or a turning state, or a state close thereto, has been assumed in which the instant SPI serving as a basis for the indication SPI that is being held has been induced. Thus, even if a certain time interval elapses since the indication SPI has been increased to a value at which it is being held, the running state approximates the running state assumed before this time interval has elapsed and therefore even if a state has been assumed in which the instant SPI is less than the held indication SPI, the fulfillment of the aforementioned decrease start condition is delayed and the indication SPI is held at the previous value. The control or operation associated with this delay may be conducted by resetting the above-described accumulated value (cumulative value) of the elapsed time or the integral value of the difference and restarting the accumulation of the elapsed time or the integration of the difference, or by reducing the accumulated value or integral value by a predetermined amount and then interrupting the accumulation or integration for a fixed time.

Figure 3:
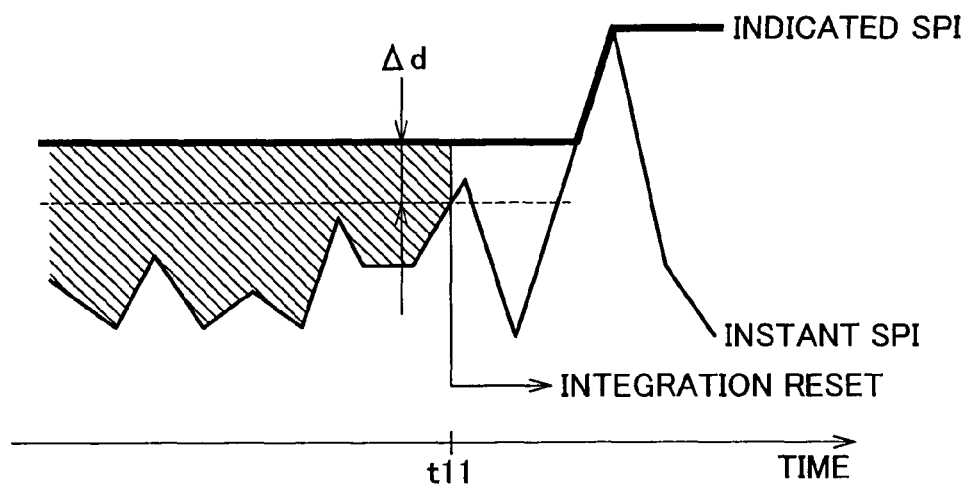
FIG. 3 illustrates how a difference between the instant SPI and indication SPI is integrated by time and how the integral value is reset.

FIG. 3 is a schematic diagram illustrating the integration of the aforementioned difference and the integration reset. The surface area of the hatched portion in FIG. 3 corresponds to the integral value. In this process, the integral value is reset at a point in time t11 at which the difference between the instant SPI and indication SPI has become equal to or less than a predetermined value $\Delta d$ and the integration of the difference is started again. Namely, the integral value is reset based on whether a difference between the instant SPI obtained at this time and the indication SPI held at a given value is equal to or smaller than a threshold value. Accordingly, the start condition for decreasing the indication SPI is not fulfilled, and, therefore, the indication SPI is held at the given value previously obtained. Then, if the instant SPI becomes larger than the held indication SPI after the integration is restarted, the indication SPI is updated to a large value corresponding to the instant SPI, and is held at this value, and the above-described integral value is reset.

When a condition for starting the control for decreasing the indication SPI is determined on the basis of the above-described integral value, the decrease degree or gradient of the indication SPI may be changed according to the length of time interval that has elapsed before this condition is fulfilled. Since the aforementioned integral value is obtained by integrating the difference between the held indication SPI and instant SPI by time, when the difference is large, the integral value reaches the predetermined value and the condition is fulfilled within a short time interval, but when the difference is small, a relatively long time elapses before the integral value reaches the predetermined value and the condition is fulfilled. Accordingly, the decrease degree or gradient of the indication SPI may be varied according to the length of the time interval that has elapsed until the condition for starting the control for decreasing the indication SPI as described above is fulfilled, for example. If the condition is fulfilled within a short interval, a decrease span of the instant SPI with respect to the indication SPI that is being held becomes large and the indication SPI greatly deviates from the driver's intention at this point in time. Accordingly, in such a case, the indication SPI is reduced at a high rate or gradient. Conversely, if the time elapsing before the condition is fulfilled is relatively long, the decrease span of the instant SPI with respect to the indication SPI that is being held becomes small and the held indication SPI cannot be said to greatly deviate from the driver's intention at this point in time. Accordingly, in such a case, the indication SPI is slowly reduced by a low rate or gradient. By doing so, the difference between the indication SPI for setting the vehicle characteristic and the driver's intention can be corrected rapidly and accurately, and the behavior characteristic of the vehicle tailored to the running state can be set.

The above-described indication SPI represents the running state of the vehicle and includes a driving environment such as road gradient or the presence of corners and curvature thereof and also the driver's driving intention. This is because the vehicle acceleration varies depending on the state of the running path and also because the vehicle is accelerated or decelerated by the driver according to the running path state and the acceleration is further changed by this acceleration/deceleration operation. The control device in accordance with the invention is configured to use the indication SPI in controlling the behavior characteristic of the vehicle. The running characteristic in accordance with the invention includes an acceleration characteristic, a turning characteristic, a suspension characteristic, and the like, and these characteristics are appropriately set by varying the aforementioned control characteristic of the throttle valve 10, shift characteristic of the transmission 13, damping characteristic provided by the shock absorber 5 in the suspension 4, and assist characteristic of the assist mechanism 18 by respectively provided actuators. As for the general tendency of changes in the running characteristic, when the indication SPI increases, the characteristic changes to enable the so-called sporty running mode.

Figure 4:
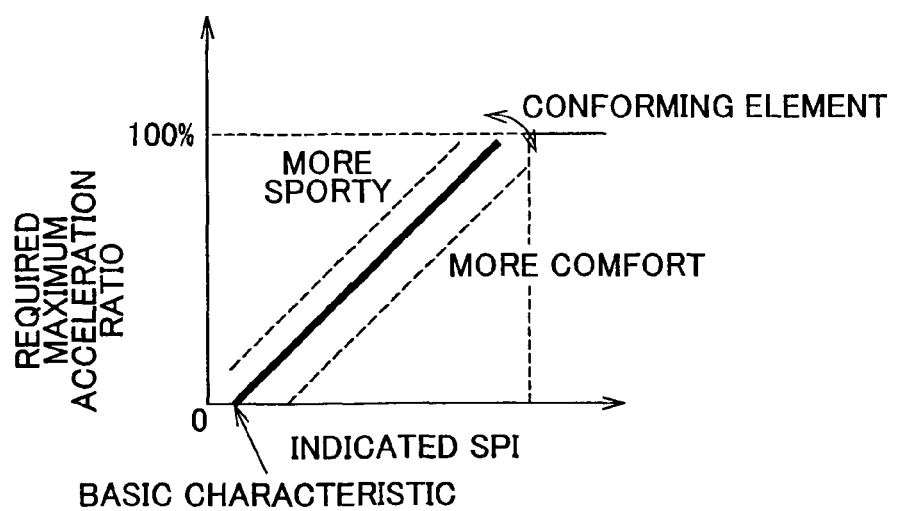
FIG. 4 is a map illustrating the relationship between the indication SPI and the required maximum acceleration ratio.

An example in which the dynamic performance or acceleration characteristic is changed according to the indication SPI will be explained below as an example of changes in such behavior characteristic. A required maximum acceleration ratio is determined according to the indication SPI that is set in the above-described manner. An example of such determination is shown in FIG. 4. The required maximum acceleration ratio as referred to herein stipulates the surplus drive power. For example, a required maximum acceleration ratio of 100% represents a state enabling the maximum acceleration that can be generated by the vehicle, and a gear ratio that ensures the maximum engine revolution speed or the largest gear ratio (the lowest-speed gear ratio) is set for the transmission 13. For example, a required maximum acceleration ratio of 50% represents a state enabling the acceleration that is half the maximum acceleration that can be generated by the vehicle, and an intermediate gear ratio is set for the transmission 13. In the example shown in FIG. 4, the required maximum acceleration ratio increases with the increase in the indication SPI. A basic characteristic shown by a solid line in FIG. 4 is determined by calculating the relationship between the indication SPI and required maximum acceleration ratio on the basis of data obtained in actual driving of the vehicle, and the basic characteristic is appropriately corrected by actually driving the vehicle or conducting simulation. When the characteristic line is set for the basic characteristic on the side where the required maximum acceleration ratio increases, the vehicle acceleration becomes relatively large and therefore the so-called sporty behavior characteristic or acceleration characteristic is obtained. Conversely, where the characteristic line is set on the side where the required maximum acceleration ratio decreases, the vehicle acceleration becomes relatively small and therefore the so-called comfort behavior characteristic or acceleration characteristic is obtained. These adjustments (that is, adaptations or tunings) may be appropriately performed according to the marketability required for the vehicle. In the basic characteristic, the required maximum acceleration ratio is set to be zero in a state in which the indication SPI is larger than zero to ensure that a state in which the vehicle is driven at a very low speed, for example, in a traffic congestion zone or when parking in a garage, is not reflected in the control conducted to set or change the acceleration characteristic.

Figure 5:
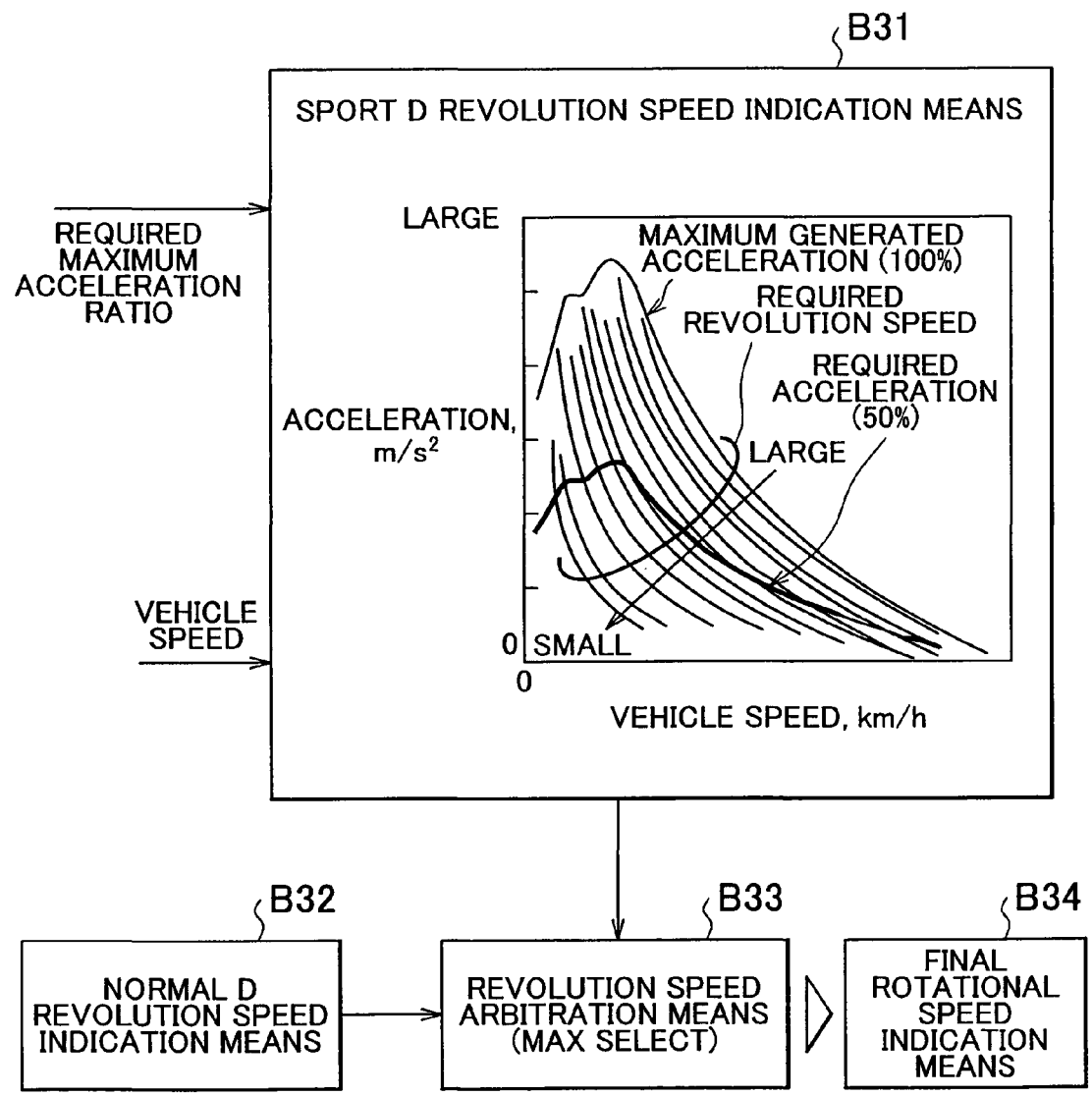
FIG. 5 is obtained by adding the required acceleration based on the indication SPI to a figure illustrating the relationship between the vehicle speed and acceleration for each required revolution speed. A procedure for determining the final indicated revolution speed on the basis of the figure is also shown.

The control conducted in a case in which the above-described required maximum acceleration ratio is reflected in the shift characteristic of the transmission 13 and the acceleration characteristic or dynamic characteristic is changed will be explained below. In a vehicle equipped with a continuously variable transmission as the transmission 13 or in a hybrid vehicle in which the engine revolution speed can be controlled by an electric motor, a target output is calculated on the basis of vehicle speed or driving requirement amount and the control is conducted to obtain an engine revolution speed at which the target output is attained. FIG. 5 shows the relationship between the vehicle speed and acceleration for each required revolution speed. The required maximum acceleration ratio determined from the indication SPI on the basis of the above-described data shown in FIG. 4 is added to this relationship. For example, thick solid lines in FIG. 5 are obtained by adding a required maximum acceleration ratio of 100% and 50%. Therefore, a revolution speed represented by a line passing through an intersection point of a line indicating the required maximum acceleration ratio determined from the indication SPI and a line indicating a vehicle speed at a present point in time is the required revolution speed.

In the vehicle equipped with the transmission 13 such as explained hereinabove with reference to FIG. 15, a basic shift map is provided to control the gear ratio that should be set by the transmission 13. This vehicle speed map is used when the so-called sport mode is nor selected or set and sets a gear ratio according to a vehicle speed and a target engine revolution speed for a continuously variable transmission. The torque demand control is a typical example of such gear ratio control. For example, the required drive power is found from a drive power map on the basis of the accelerator depression amount and vehicle speed serving as driving requirement amount, and the required power of the engine is determined from the required drive power and vehicle speed or engine revolution speed. A target engine revolution speed at which the required output is outputted with optimum fuel efficiency is determined on the basis of an engine revolution speed map, and a gear ratio of the continuously variable transmission is controlled so as to attain the target engine revolution speed. Thus, the transmission 13 is caused to function as a revolution speed control mechanism for the engine which is a drive power source. Since the engine output can be determined by a product of torque and revolution speed, an engine torque at which the required output is attained is determined on the basis of the aforementioned target engine revolution speed or vehicle speed corresponding thereto, and a throttle, opening degree is calculated to obtain such engine torque.

A sport revolution speed indication means B31 shown in FIG. 5 is a means for indicating the target revolution speed determined on the basis of the above-described indication SPI and corresponds to the so-called sport revolution speed calculation means. A normal revolution speed indication means B32 is a means for indicating the required revolution speed determined by the usual engine revolution speed control such as the torque demand control and corresponds to the so-called normal revolution speed calculation means. The so-called normal revolution speed and the so-called sport revolution speed are compared (arbitrated) by a revolution speed arbitration means B33 and a larger revolution speed is selected. The so-called max select is made. The revolution speed that has thus been selected is outputted as a control signal by a final revolution speed indication means B34. Therefore, since the driving requirement amount such as an accelerator depression amount or the like is small, when the normal revolution speed is lower than the sport revolution speed, the sport revolution speed is maintained. It is to be noted that when the driving requirement amount exceeds a value corresponding to the required maximum acceleration, for example, when the accelerator pedal is depressed by a large degree, downshifting occurs.

Such control is the shift control aimed at a gear ratio on a low vehicle speed side (large value of gear ratio) in the continuously variable transmission. As a result, the drive power or engine brake force is increased by the increase in gear ratio, the vehicle behavior becomes agile and the characteristic with the so-called sporty feeling or a characteristic adapted to driver's intention or driving environment such as a state of the running path is obtained. Such control relating to the vehicle equipped with the continuously variable transmission may be performed when a mode selection switch is installed and the so-called sport mode is selected by the switch, and the control may be prohibited when the sport mode is not selected.

Figure 6:
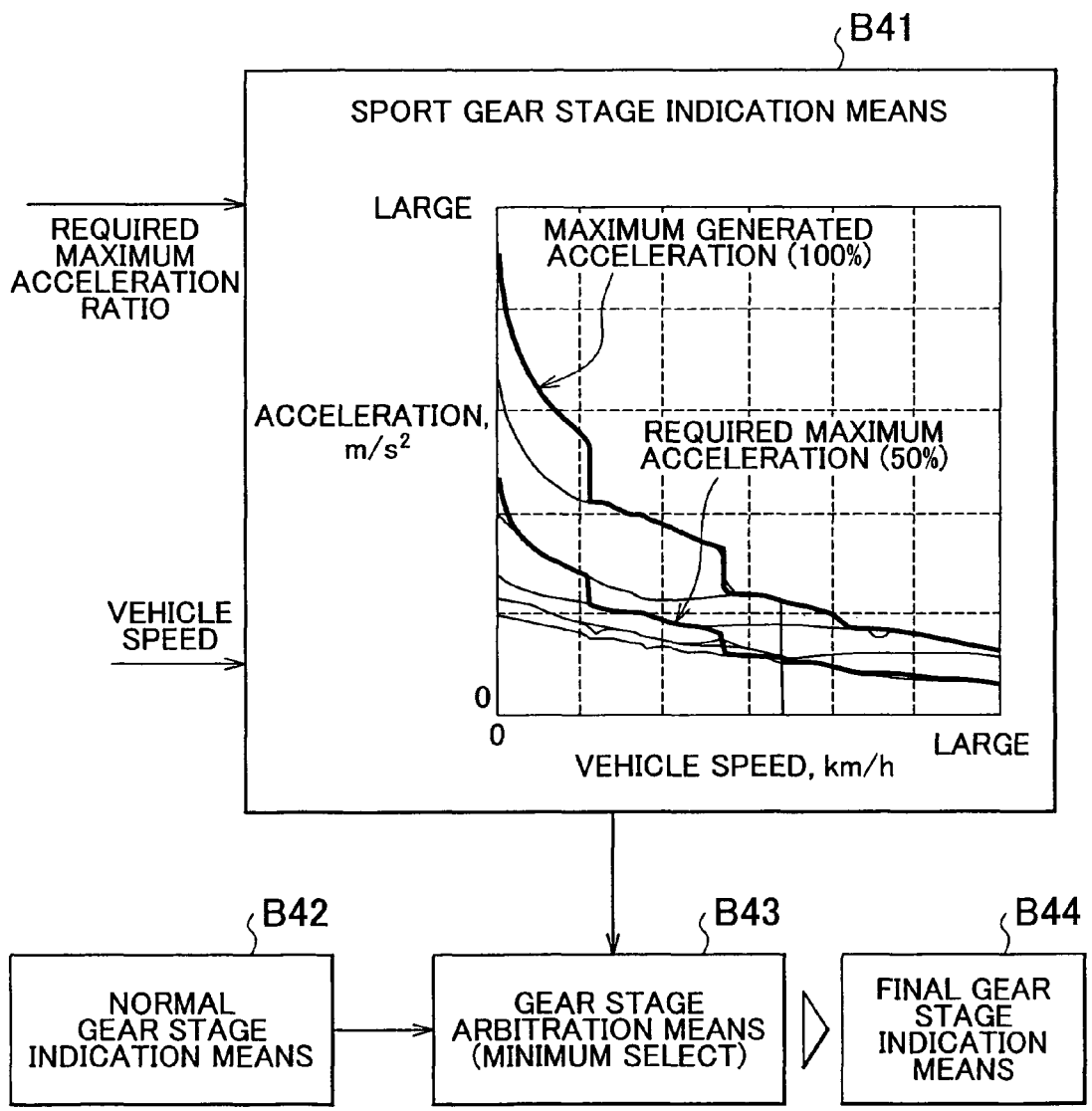
FIG. 6 is obtained by adding the required acceleration based on the indication SPI to a figure illustrating the relationship between the vehicle speed and acceleration for each shift stage. A procedure for determining the final indicated shift stage on the basis of the figure is also shown.

By contrast, when the transmission 13 is a multi-stage transmission, the control is conducted as shown in FIG. 6. When a multi-stage transmission is shift controlled, a target shift stage is established and a control command signal is outputted to an actuator of the transmission 13 to set this shift stage. Therefore, the relationship between the vehicle speed and acceleration for each shift stage will be such as shown in FIG. 6. A thick solid line shown in FIG. 6 is obtained by adding lines of a required maximum acceleration of 100% and 50%, as a required maximum acceleration ratio determined from the indication SPI, to this relationship. Therefore, a shift stage represented by a line of shift stage that is the closest to an intersection point of a line indicating the required maximum acceleration determined from the indication SPI and a line indicating a vehicle speed at a present point in time is the required shift stage (required gear ratio).

When control with the control device in accordance with the invention is performed, the target sport shift stage determined in the above-described FIG. 6 and a target normal shift stage (for example, a gear ratio determined based on an accelerator operation and a vehicle speed) based on a shift diagram that has been prepared in advance are compared (gear stage arbitration) and a shift stage on a low vehicle speed side with a high gear ratio is selected. This is the so-called minimum select. Thus, the target normal shift stage of the multi-stage transmission is set on the basis of a shift diagram (shift map) that establishes a region of each shift stage by the vehicle speed and driving requirement amount such as an accelerator depression amount, and therefore when the driving requirement amount exceeds a value corresponding to the required maximum acceleration, for example, when the accelerator pedal is depressed by a large degree, downshifting occurs, and when the vehicle speed further increases, upshifting can occur.

A sport gear sage indication means B41 shown in FIG. 6 is a means for indicating the gear stage determined on the basis of the above-described indication SPI, and a normal gear stage indication means B42 is a means for indicating the gear stage determined on the basis of the usual shift diagram based on the accelerator operation and the vehicle speed. The so-called sport gear stage and normal gear stage are compared (arbitrated) by a gear stage arbitration means B43 and a gear stage on a lower speed side (gear stage with a higher gear ratio) is selected. The so-called minimum select is made. The gear stage that has thus been selected is outputted as a control signal by a final gear stage indication means B44. Thus, the transmission 13 is caused to function as a revolution speed control mechanism for the engine which is a drive power source. Therefore, since the driving requirement amount such as an accelerator depression amount is small, when the normal gear stage is on the vehicle speed side higher than that of the sport gear stage, the sport gear stage is maintained and a gear stage on the lower vehicle speed side (high gear ratio) is set.

Such control is the shift control aimed at a gear stage on a low vehicle speed side (large value of gear ratio) in the multi-stage transmission. As a result, the drive power or engine brake force is increased by the increase in gear ratio, the vehicle behavior becomes agile and the characteristic with the so-called sporty feeling or a characteristic adapted to driver's intention or driving environment such as a state of the running path is obtained. Such control relating to the vehicle equipped with the multi-stage transmission may be performed when a mode selection switch is installed and the so-called sport mode is selected by the switch, and the control may be prohibited when the sport mode is not selected.

The functions of the means shown in FIG. 5 or the functions of the means shown in FIG. 6 can be incorporated in the ECU 28, or an electronic control device for sport mode control can be provided and the functions can be incorporated in the electronic control device for sport mode control.

In the examples shown in FIGS. 5 and 6 above, an indication SPI indicating the sportiness is determined on the basis of acceleration, a required acceleration is calculated on the basis of the indication SPI and vehicle speed, and the engine revolution speed or gear ratio (gear stage) is controlled to attain the required acceleration. Therefore, the required engine revolution speed or required gear ratio for each vehicle speed is eventually determined on the basis of sportiness. Further, the required acceleration determined on the basis of the indication SPI may be maintained, that is, the required engine revolution speed or the required gear ratio may be maintained.

Figure 7:
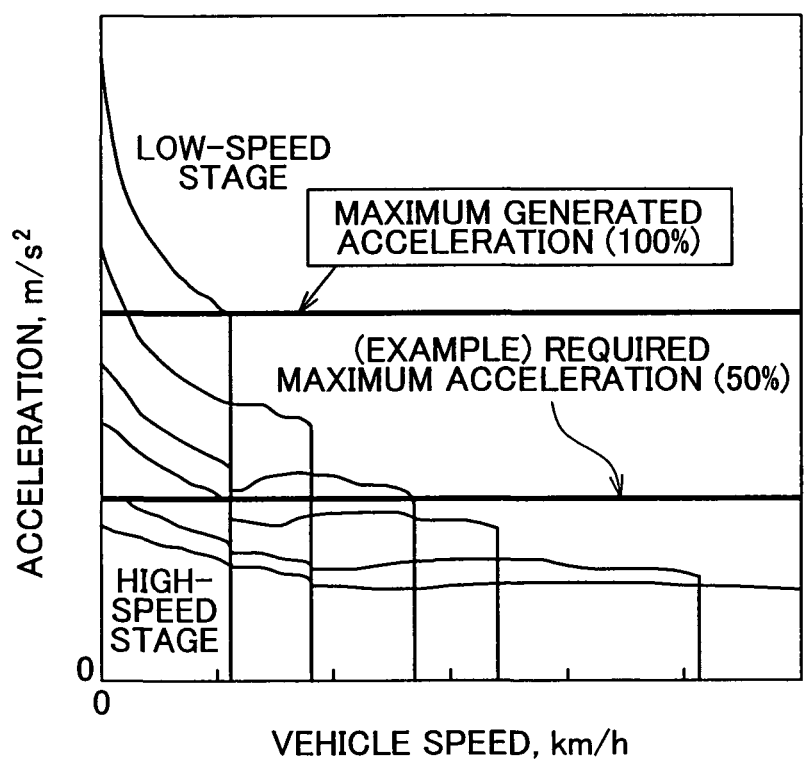
FIG. 7 is a diagram obtained by adding a line at which the required maximum acceleration has a constant value based on the indication SPI to a diagram representing the acceleration for each vehicle speed and each shift stage.

An example of such configuration will be explained below with reference to FIG. 7. In the example shown herein, the required maximum acceleration determined on the basis of the indication SPI is 50%. Where the indication SPI and the required maximum acceleration ratio based thereon are determined by switching to a sport mode when the vehicle runs at a predetermined speed (for example, 50 km/h), an acceleration responding to the required maximum acceleration ratio corresponding to the maximum generated acceleration at this point in time (for example, the maximum acceleration that can be generated at the lowest speed stage that can be set at this point in time, such as a first speed stage) is determined as the required maximum acceleration. This required maximum acceleration ratio is maintained even if the vehicle speed changes, and the required engine revolution speed or required gear ratio is controlled so as to attain this required maximum acceleration ratio regardless of the vehicle speed value. In FIG. 7, the line showing the required maximum acceleration ratio is plotted in a high vehicle speed range to exceed the maximum acceleration that can be generated at this vehicle speed, but at such high vehicle speed, the required maximum acceleration ratio cannot be attained, the lowest speed stage at a respective vehicle speed is set and the maximum acceleration possible at the lowest speed stage is attained. Where control is performed as shown in FIG. 7, excess dynamic performance or excess acceleration characteristic can be obtained in accordance with the driver's intention, regardless of the vehicle speed. In the example shown in FIG. 7, the vehicle equipped with a multi-stage transmission is taken as a control object, but similar control can be also performed with respect to a vehicle equipped with a continuously variable transmission.

In the examples shown in FIGS. 5 and 6 described above, the required maximum acceleration determined on the basis of the indication SPI, or the required revolution speed or required gear ratio at which the required maximum acceleration is attained changes according to the vehicle speed, whereas in the example shown in FIG. 7, the required maximum acceleration or the required revolution speed or required gear ratio at which the required maximum acceleration is attained is maintained at the initial value even if the vehicle speed changes. Since these types of control have different technical advantages, either control may be performed according to the indication SPI value in order to realize the respective advantage according to the running state of the vehicle.

Figure 8:
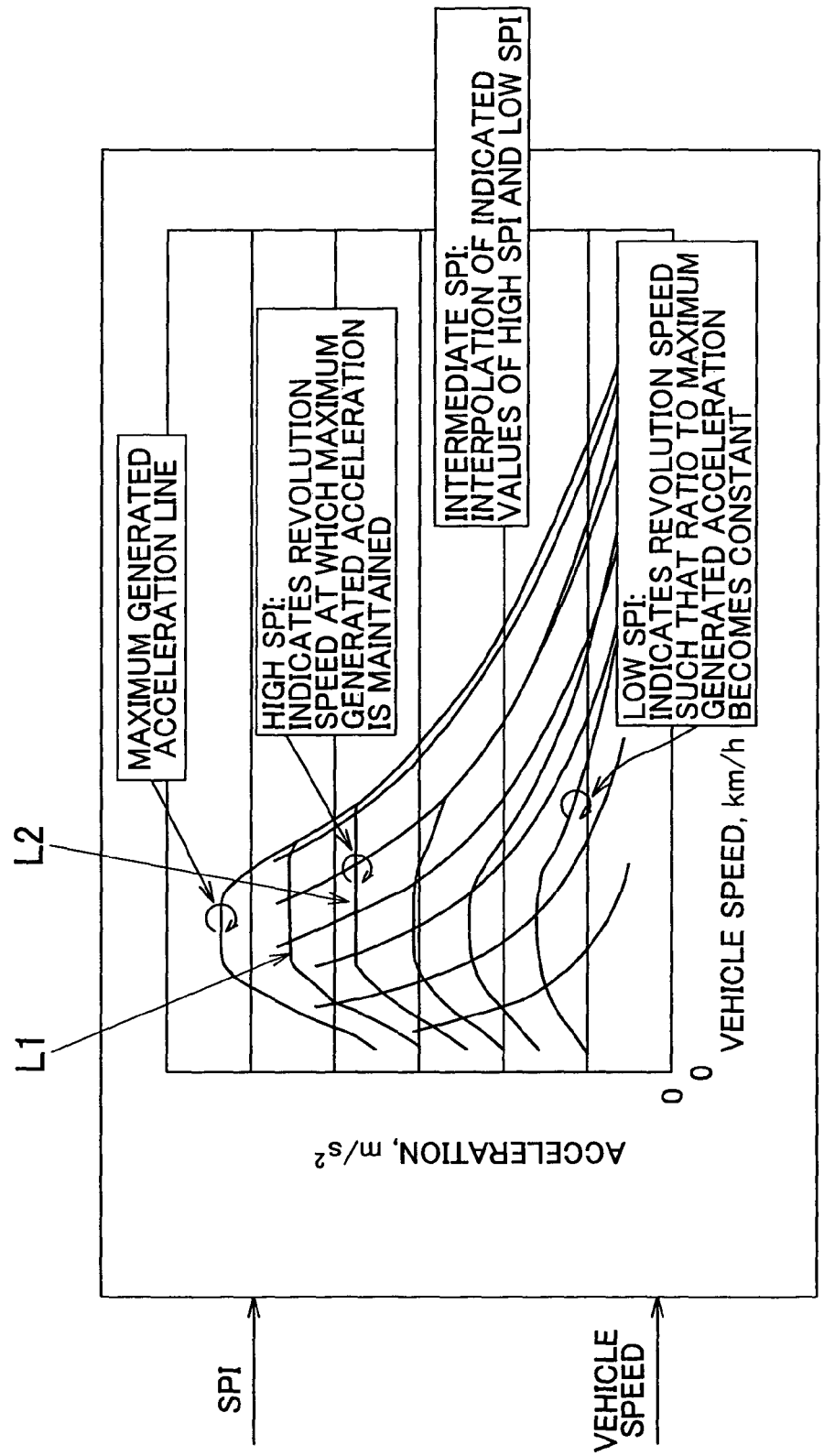
FIG. 8 is a diagram illustrating an example of an acceleration map that can be used in the control in which the required maximum acceleration is maintained constant at a high indication SPI and set to a value corresponding to the required maximum acceleration ratio at a low indication SPI.

An example of such control is shown in FIG. 8 in relation to a case in which a vehicle quipped with a continuous variable transmission is a control object. FIG. 8 shows a map for setting the required maximum acceleration ratio on the basis of the indication SPI and vehicle speed. Thin curved lines in the figure indicate a gear ratio and thick curved lines indicate the required maximum acceleration ratio for each indication SPI. Thus, the line indicating the required maximum acceleration ratio rises with the increase in the value of the indication SPI, that is, the increase in sportiness. The line indicating the required maximum acceleration ratio corresponding to the intermediate indication SPI may be determined by interpolation on the basis of the indicated value at a low indication SPI and an indicated value at a high indication SPI. Therefore, the lines of the required maximum acceleration ratios shown by symbols L1 and L2 in FIG. 8 are selected when the indication SPI is relatively large. With such a feature, the required maximum acceleration ratio is maintained at a constant value till the maximum generated acceleration corresponding to the vehicle speed is attained.

When the required maximum acceleration ratio is controlled or the required engine revolution speed or required gear ratio is controlled to attain the required maximum acceleration ratio as shown in FIG. 8, where the value of indication SPI is decreased by low sportiness, the required acceleration is set to an acceleration at a predetermined ratio to the maximum generated acceleration at each vehicle speed. As a result, excess dynamic performance or excess acceleration characteristic adapted to the driver's intention can be realized and at the same time the engine revolution speed can be prevented from reaching the upper limit at a low vehicle speed and the acceleration can be prevented from becoming exceedingly high. Further, when the indication SPI value is high, since the required maximum acceleration ratio that has once been set is maintained, regardless of the vehicle speed, high excess dynamic performance or high excess acceleration characteristic is set and from this standpoint the performance adapted to the driver's intention can be also obtained.

The aforementioned indication SPI reflects the acceleration operation, brake operation, or steering operation performed by the driver and also reflects road conditions such as cornering or uphill-downhill roads. Accordingly, a larger acceleration-deceleration operation generates a larger indication SPI value, and therefore the indication SPI can be replaced with the acceleration requirement from the driver or driving requirement amount. In accordance with the invention, such technological features of indication SPI can be used to select the shift stage (gear ratio) on the basis of the indication SPI.

FIG. 9 shows an example of a shift map used with a configuration such that the shift stage is set on the basis of sportiness in a vehicle equipped with a multi-stage automatic transmission. In the figure, the vehicle speed is plotted against the abscissa and the indication SPI is plotted against the ordinate. In this shift map, an upshift line (solid line in FIG. 9) and a downshift line (broken line in FIG. 9) are set by the vehicle speed and indication SPI. Therefore, when shift control based on FIG. 9 is performed, where the vehicle shift increases or the indication SPI decreases and the running state defined by these vehicle speed and indication SPI varies and exceed the upshift line, the upshift defined by the upshift line is performed. By contrast, where the vehicle speed decreases or the indication SPI increases, causing the running state defined by these vehicle speed and indication SPI to vary and exceed the downshift line, the downshift defined by the downshift line is performed. The indication SPI, as mentioned hereinabove, reflects the acceleration that occurs following the operation performed by the drive and also reflects the running state of the vehicle. Therefore, where the shift control is conducted according to the map shown in FIG. 9, shift control can be performed that reflects the driver's intention rather than the driver's driving requirement for each instant.

When the engine revolution speed is increased or the gear stage is changed to a gear stage on the low speed side by the so-called arbitration control according to the increase in the driving requirement amount, it is preferred that the engine revolution speed or gear stage on the low speed side be set in the following manner. Thus, because the required acceleration can be determined on the basis of the driving requirement amount such as an accelerator depression amount or the vehicle speed, when the required acceleration determined based on the driving requirement amount exceeds the acceleration determined from the vehicle speed and the required maximum acceleration ratio determined on the basis of the aforementioned indication SPI, the engine revolution speed or gear stage may be set such as to generate the required acceleration determined on the basis of the driving requirement amount such as an accelerator depression amount. Alternatively, since the maximum generated acceleration that can be outputted at a point in time at which the driving requirement amount has increased is a value determined by the vehicle speed and gear ratio, the engine revolution speed or gear stage may be set such as to generate an acceleration obtained by prorating the difference between the maximum generated acceleration and the acceleration determined on the basis of the indication SPI, for example found from FIG. 5 or 6, by a ratio of the driving requirement amount such as an accelerator depression amount to the maximum value thereof. Thus, interpolation between the maximum generated acceleration and the acceleration determined on the basis of the indication SPI, for example found from FIG. 5 or 6, may be performed according to the driving requirement amount.

Thus, when switching from the acceleration based on the indication SPI to the acceleration based on the driving requirement amount, it is preferred that the control responsiveness of this switching increase with the increase in the indication SPI. In other words, where the indication SPI has already increased, the driver apparently desires a sportier running mode or a more agile running mode and the driving requirement amount further increases in this state. Therefore, it is preferred that the revolution speed selected by the aforementioned max select or the gear stage selected by the minimum select be rapidly attained and the excess acceleration characteristic of the vehicle be increased. Conversely, where the indication SPI is comparatively small, the so-called mild running mode is apparently requested. Therefore, the required revolution speed selected by the aforementioned max select or the gear stage selected by the minimum select may be gradually attained. In such a case, the acceleration varies smoothly, the deviation from the required acieration ability is small, and a feeling of discomfort can be reduced.

Figure 10:
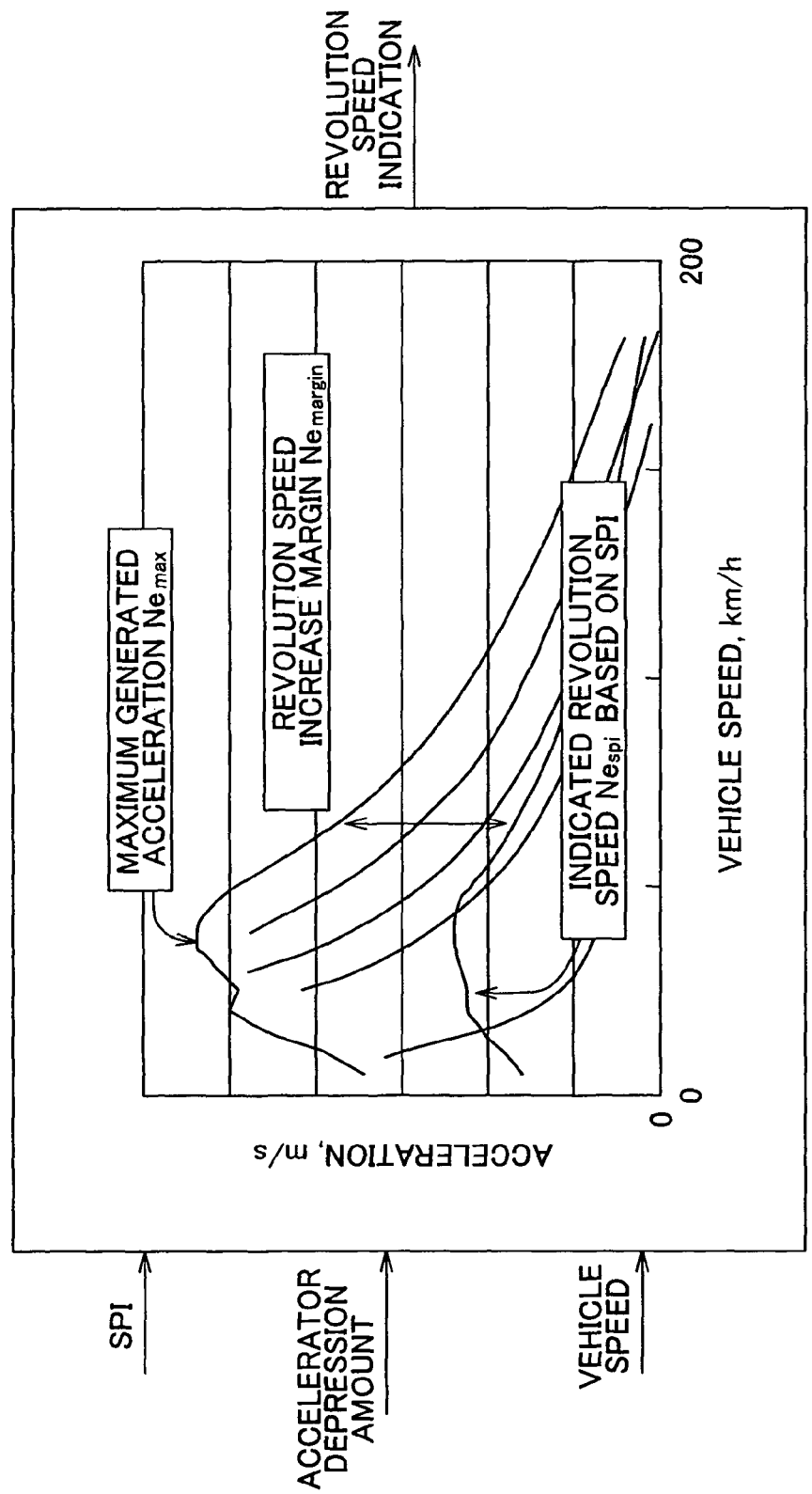
FIG. 10 is a diagram illustrating an example of a map that can be used to determine the indicated revolution speed when a vehicle equipped with a continuous variable transmission is a control object.

An example in which such control reflecting the driver's acceleration operation is performed with respect to a vehicle equipped with a continuously variable transmission will be explained below. FIG. 10 shows a diagram obtained by adding an indicated revolution speed $Ne_{spi}$ corresponding to the required maximum acceleration and a revolution speed $Ne_{max}$ corresponding to the maximum generated acceleration in a case in which the predetermined SPI has been set to a diagram in which the acceleration corresponding to the vehicle speed is shown for each gear ratio. When the required maximum acceleration determined on the basis of the accelerator operation amount (that is, accelerator depression amount) or the target revolution speed corresponding to the required maximum acceleration is greater than the required revolution speed $Ne_{spi}$ corresponding to the indication SPI, the indicated revolution speed corresponding to the accelerator operation amount is set to a revolution speed obtained by interpolating between the required revolution speed $Ne_{spi}$ corresponding to the indication SPI and the revolution speed $Ne_{max}$ corresponding to the maximum generated acceleration according to the accelerator operation amount. Thus, a revolution speed increase margin $Ne_{margin}$ in a vehicle speed at a point in time at which the indicated revolution speed corresponding to the accelerator operation amount is found is calculated by the following equation: $Ne_{margin}=Ne_{max}-Ne_{spi}$.

The revolution speed increase margin $Ne_{margin}$ is interpolated from a throttle opening degree of 0% to that of 100%, and a static required revolution speed $Ne_{req\_st}$ corresponding to the throttle opening degree Pa at this point in time is determined. In this case, it is preferred that the interpolation of the indicated revolution speed based on the throttle opening degree differ depending on the indication SPI, so that the interpolation close to the linear interpolation be performed when the indication SPI is large and the non-linear interpolation be performed when the indication SPI is small. As a result, in a state with a high indication SPI, dynamic performance or driving characteristic adapted to the driver's intention can be obtained. Further, in a state with a low indication SPI, the transition from the control based on the indication SPI to the control based on the throttle opening degree, or the variation in vehicle behavior caused by such a transition can be prevented from causing a feeling of discomfort.

Figure 11:
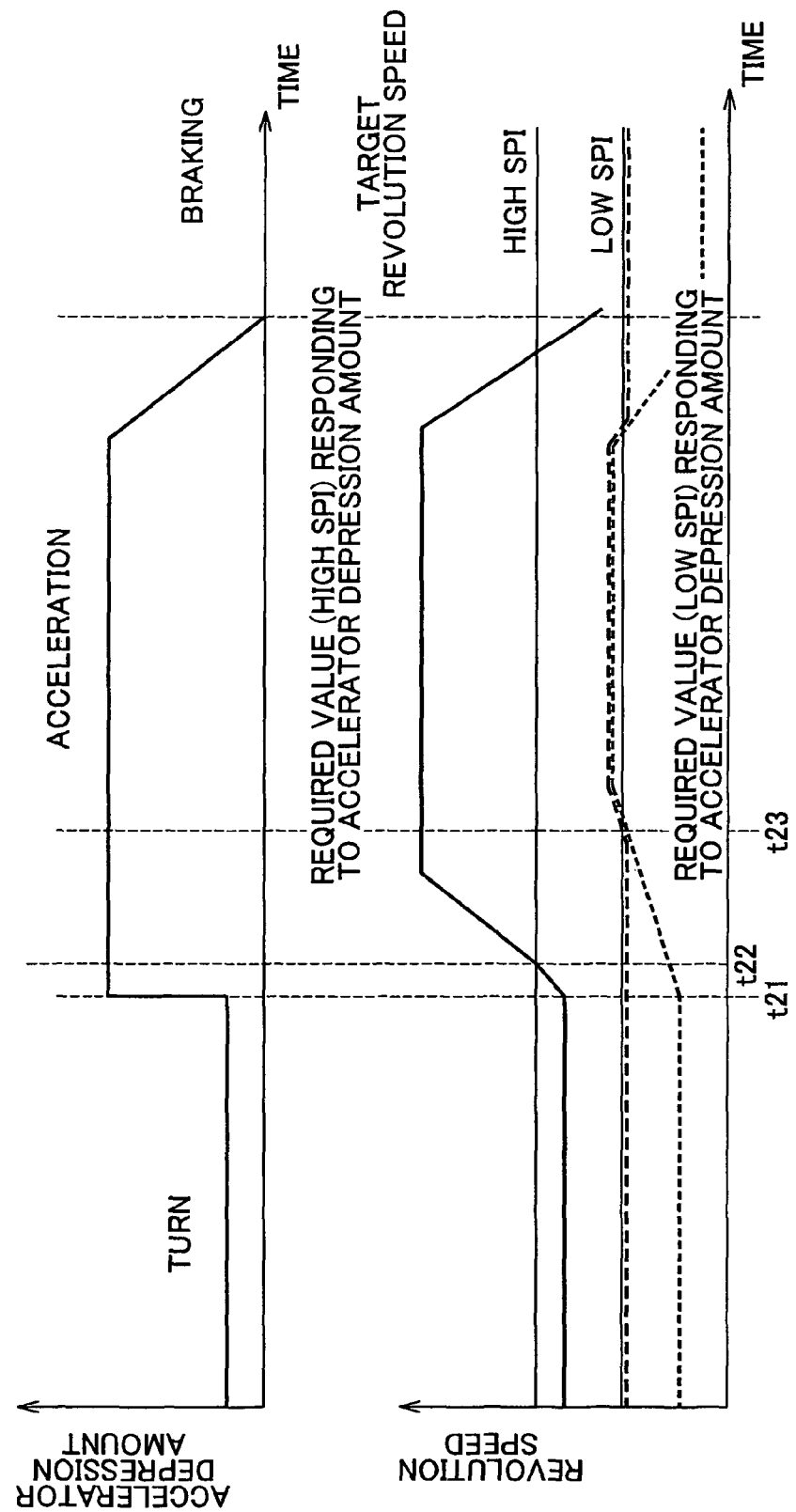
FIG. 11 is a time chart illustrating, with respect to a case of a high indication SPI and a case of a low indication SPI, a mode of changing the target revolution speed when there is an acceleration requirement from the driver.

In order to meet the driver's driving requirement and also avoid the feeling of discomfort, it is preferred that the control responsiveness (that is, the dynamic required revolution speed) for attaining the engine revolution speed corresponding to the accelerator depression amount differ depending on the indication SPI, which is a sportiness. An example of such control will be explained below by using a time chart shown in FIG. 11. When a vehicle makes a turn in a state in which the predetermined indication SPI has been set and the target (engine) revolution speed found on the basis of the accelerator depression amount at this time is less than the required (engine) revolution speed determined on the basis of the indication SPI, the control that changes the indication SPI is restricted or prohibited, the previous value of the indication SPI is maintained, and the required revolution speed determined on the basis of the indication SPI is taken as the indicated revolution speed.

When the vehicle completes the turn and the driver depresses the accelerator pedal by a large degree (point in time t21), the increase gradient of the target revolution speed is set such as to obtain the target revolution speed corresponding to the accelerator depression amount. This gradient is the aforementioned control responsiveness. Further when the target revolution speed in this process is a dynamic required revolution speed and the indication SPI is large, the gradient is high, and when the indication SPI is low, the gradient is small. After the target revolution speed that is increased at the gradient set in such a manner has exceeded the required revolution speed determined on the basis of the indication SPI, the target revolution speed determined on the basis of the throttle opening degree is taken as an indicated revolution speed for revolution speed control. Thus, in FIG. 11, in a state with a high indication SPI, the revolution speed control based on the target revolution speed is performed at a point in time t22 and thereafter, and in a state with a low indication SPI, the revolution speed control based on the target revolution speed is performed at a point in time t23 and thereafter. When the vehicle speed is high, the control may be performed in the same manner as in the case of a high indication SPI, and when the vehicle speed is low, the control may be performed in the same manner as in the case of a low indication SPI.

Therefore, when high sportiness is required or when the vehicle runs with high sportiness, the large increase in the driving requirement amount determined by an accelerator operation or the like causes the indicated revolution speed to increase rapidly and at high variation rate. As a result, the responsiveness of acceleration control is high and a running mode adapted to the driver's intention becomes possible. Conversely, in a state in which running in the so-called comfort mild mode is required or the vehicle runs in such mode, when the acceleration is performed on the basis of an acceleration operation such as a throttle opening degree, the acceleration induced by the operation that requires acceleration is performed gradually. Therefore, similarly, a running mode adapted to the driver's intention becomes possible.

Figure 12:
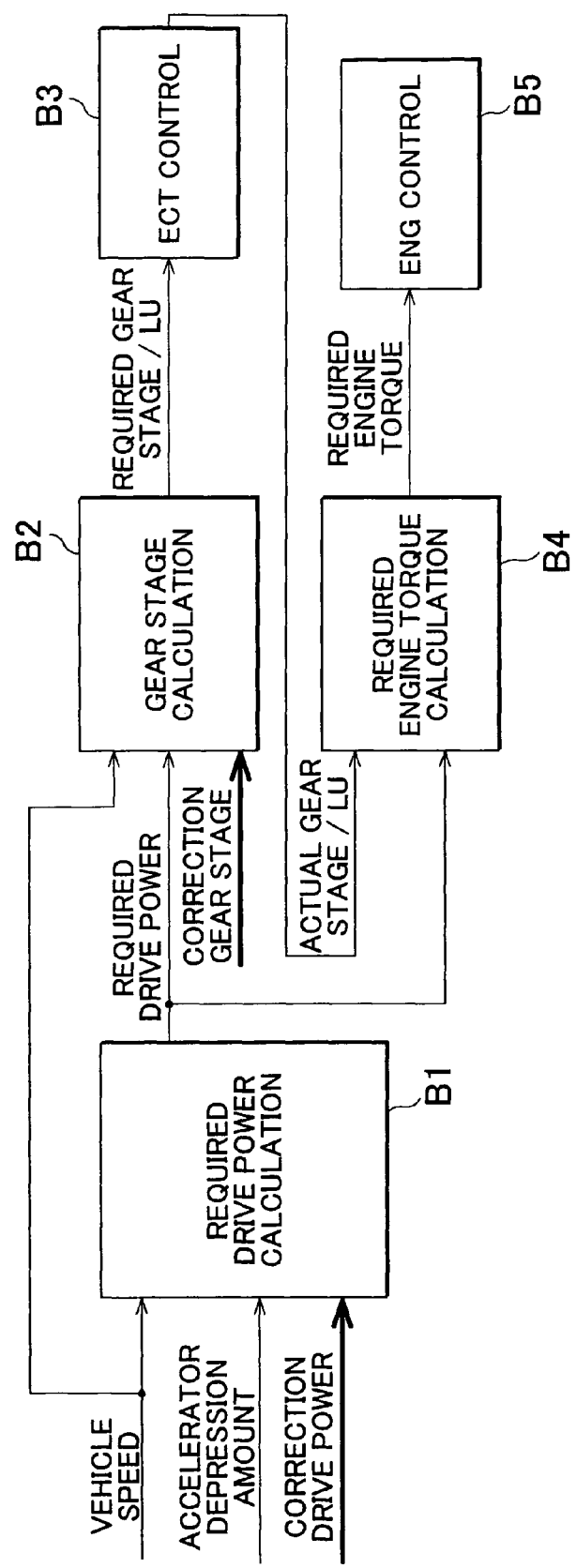
FIG. 12 is a block diagram of control in which a corrected shift stage and corrected drive power determined on the basis of the indication SPI for a vehicle equipped with a multi-stage automatic transmission is reflected in the shift control and engine output control.

An example in which a revolution speed or gear ratio is controlled on the basis of the indication SPI determined in the above-described manner will be explained below. In the example shown in FIG. 12, a target shift stage and a target engine torque are determined from the required drive power. In the basic configuration of such control, first, the required drive power is calculated from the vehicle speed and accelerator depression amount (block B1). Since the required drive power is determined by the vehicle weight and dynamic performance provided to the wheels, the calculation in the block B1 is performed by preparing a map in which the required drive power is associated with the vehicle speed and accelerator depression amount, and the required drive power is determined on the basis of the map. A shift stage (gear stage) is calculated on the basis of the required drive power (block B2). Shift control of a multi-stage transmission is performed on the basis of a shift diagram in which shift stage regions or an upshift line and a downshift line are set by taking the vehicle speed and required drive power as parameters. Therefore, the calculation of shift stages in the block B2 is performed on the basis of a shift diagram that has been prepared in advance. The required shift stage thus determined is outputted as a control command signal to the shift control device (ECT) B3 and the shift control in the transmission 13 is performed. When a lockup clutch (LU) is provided in a power transmission train of the vehicle 1, the engagement-disengagement of the LU is determined on the basis of a map that has been prepared in advance and a command signal that controls the engagement and disengagement is also outputted.

Meanwhile, the required engine torque is calculated on the basis of the required drive power determined in the block B1 and the actual shift stage in the transmission 13 (block B4). Thus, since the engine revolution speed is determined on the basis of the shift stage and vehicle speed, the required engine torque can be calculated on the basis of the engine revolution speed and required drive power. The engine (ENG) 8 is controlled so as to generate the engine torque that has thus been determined (block B5). More specifically, the throttle opening degree is controlled.

As described hereinabove, in the control device in accordance with the invention, when the longitudinal acceleration Gx, lateral acceleration Gy, or composite acceleration in which the two are combined is high, the indication SPI increases and the required maximum acceleration increases accordingly. The required maximum acceleration is reflected in the shift control, as explained with reference to FIG. 6, and where the shift stage determined on the basis of the indication SPI in the sport mode (sport) is a shift stage on the side of vehicle speed lower than that of the shift stage in the normal mode (normal), this shift stage on the low vehicle speed side becomes the final indicated shift stage. In the basic configuration explained with reference to FIG. 12, the shift control in the normal mode is performed. Therefore, where the final indicated shift stage based on the indication SPI is a shift stage on the low vehicle speed side, it is taken in by the block B2 and assumed as the required shift stage. As a result, a relatively high gear ratio is set and therefore the acceleration performance is increased as a vehicle behavior characteristic.

Further, in order to obtain the acceleration characteristic corresponding to the indication SPI, the power outputted by the engine 8 may be increased or decreased, and in this control, correction drive power is inputted in the aforementioned block B1 and the required drive power determined in the aforementioned basic configuration is increased or decreased by the correction drive power. The correction drive power may be configured to be determined on the basis of the aforementioned indication SPI. For example, it is possible to establish the relationship between the indication SPI and the correction drive power by tests or simulation, prepare this relationship in advance as data in the form of a map or the like, and determine the correction drive power from the data such as the correction drive power map and the indication SPI obtained during driving.

Figure 13:
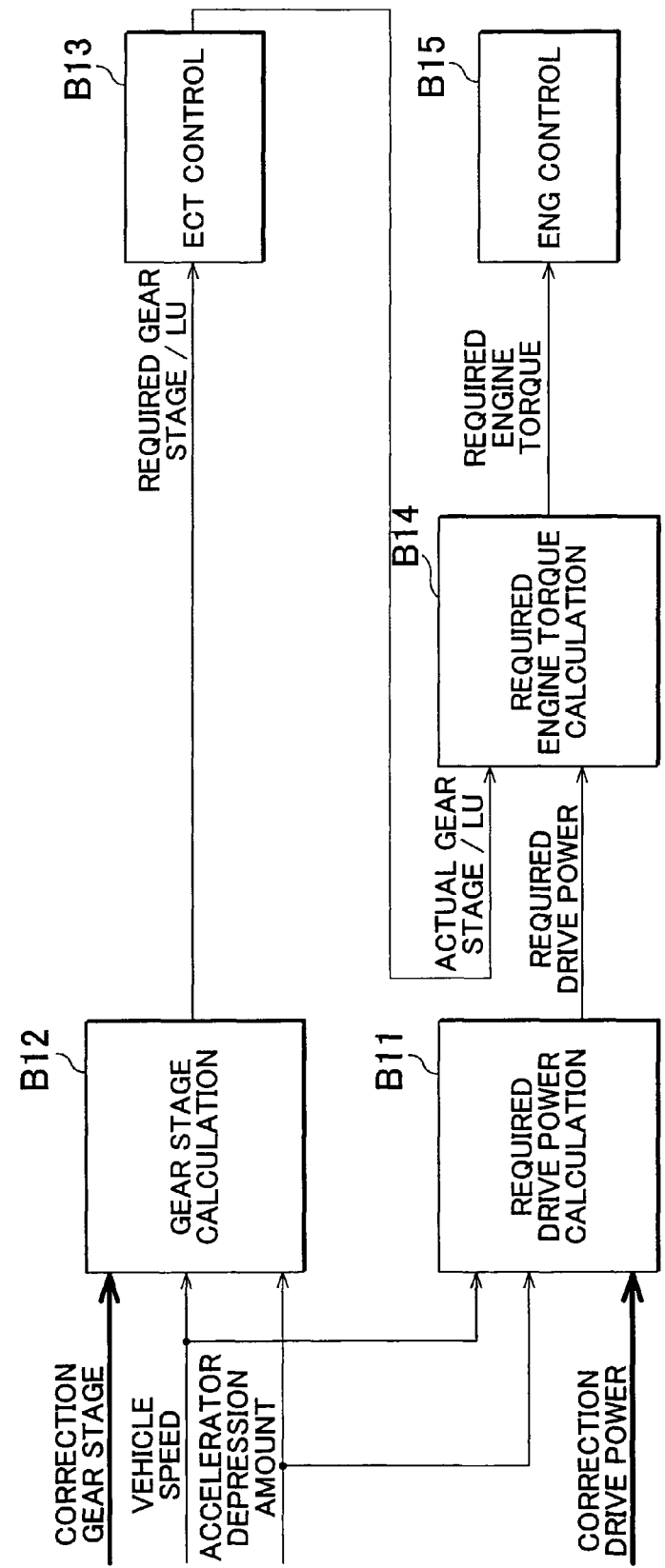
FIG. 13 is a block diagram of another control in which a corrected shift stage and corrected drive power determined on the basis of the indication SPI for a vehicle equipped with a multi-stage automatic transmission is reflected in the shift control and engine output control.

In the example shown in FIG. 13, the shift stage (gear stage) and the required drive power are determined in parallel from the vehicle speed and accelerator depression amount. As described above, the gear ratio of the multi-stage transmission is controlled on the basis of a shift diagram in which shift stages or the upshift line and downshift line are set by the vehicle speed and accelerator depression amount. Therefore, on the one hand, the shift stage is calculated from the vehicle speed and accelerator depression amount (block B12), and on the other hand, the required drive power is calculated from the vehicle speed and accelerator depression amount (block B11). Such calculation of the required drive power is similar to the calculation performed in the aforementioned block B1 shown in FIG. 12.

The required shift stage determined in the block B12 is transmitted to the ECT B13 and the shift control in the transmission 13 is performed. When an LU is provided in a power transmission train of the vehicle 1, the engagement-disengagement of the LU is determined on the basis of a map that has been prepared in advance and a command signal that controls the engagement and disengagement is also outputted.

Meanwhile, the required engine torque is calculated on the basis of the required drive power determined in the block B11 and the actual shift stage in the transmission 13 (block B14), and the engine (ENG) 8 is controlled so as to generate the engine torque that has thus been determined (block B15). The control in the block B14 is similar to that in the above-described block B4 shown in FIG. 12, and the control in the block B15 is similar to that in the above-described block B5 shown in FIG. 12.

In the configuration shown in FIG. 13, where the final indicated shift stage based on the indication SPI is a shift stage on the lower vehicle speed side, it is taken in the block B12 and assumed as the required shift stage. As a result, a comparatively high shift ratio is set and therefore the acceleration performance is increased as a vehicle behavior characteristic. Further, the correction drive power corresponding to the indication SPI is inputted in the above-described block B11 and the required drive power determined in the above-described basic configuration is increased or decreased by the correction drive power.

Figure 14:
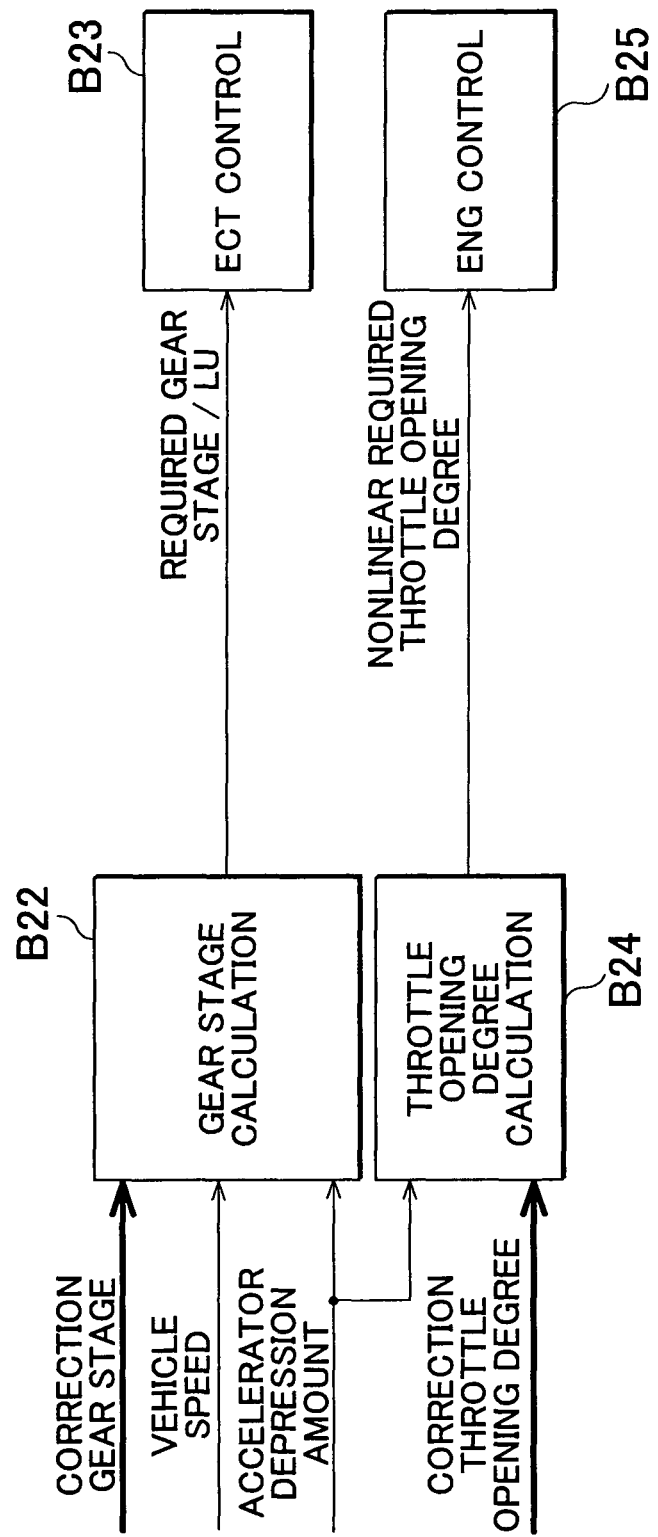
FIG. 14 is a block diagram of yet another control in which a corrected shift stage and corrected drive power determined on the basis of the indication SPI for a vehicle equipped with a multi-stage automatic transmission is reflected in the shift control and engine output control.

Further, in the example shown in FIG. 14, the transmission 13 and engine 8 are controlled independently from each other on the basis of vehicle speed and acceleration depression amount. Thus, a shift stage is calculated on the basis of vehicle speed and accelerator depression amount (block B22), the required shift stage determined by such calculations is transmitted to the ECT B23, and shift control in the transmission 13 is performed. This control is similar to that in the block B12 and block B13 shown in FIG. 13. Further, a throttle opening degree is calculated on the basis of accelerator depression amount (block B24) and the engine 8 is controlled in response to the required throttle opening degree (block B25). When an electronic throttle valve is provided, the relationship between the accelerator depression amount and the required throttle opening degree is generally not linear, and when the accelerator depression amount is relatively small, the variation amount of throttle opening degree is less than that of the accelerator depression amount. When the accelerator depression amount is relatively large, the variation amount of accelerator depression amount and the variation amount of throttle opening degree are close to a one-to-one relationship.

With the basic configuration such as shown in FIG. 14, where the final indicated shift stage based on the indication SPI is a shift stage on the lower vehicle speed side, it is also taken into the block B22 and assumed as the required shift stage. As a result, a relatively high gear ratio is set and therefore acceleration performance is increased as a vehicle behavior characteristic. Further, the correction throttle opening degree corresponding to the indication SPI is inputted in the aforementioned B24 and the required throttle opening degree determined in the aforementioned basic configuration is increased or decreased by the correction throttle opening degree.

As described hereinabove, in the control device in accordance with the invention, where the acceleration increases according to the intention to accelerate/decelerate or turn the vehicle as in the case in which the driver steps on the accelerator pedal 12 to accelerate the vehicle, steps on the brake pedal 7 to decelerate the vehicle, or rotates the steering wheel 16 to turn the vehicle, the indication SPI immediately increases according to the increase in acceleration. The excess acceleration performance increases according to the increase in the indication SPI, and a running characteristic is obtained that enables the so-called sporty running mode according to the driver's intention. When the acceleration requirement based on the driver's accelerator pedal operation is greater than that based on the indication SPI, this driver's operation is reflected in the acceleration performance, and the vehicle is accelerated or drive power is increased based on the driver's accelerator pedal operation and the vehicle speed. Further, since the aforementioned driver's operation is usually performed such that the vehicle runs according to driving environment such as a running path gradient, the above-described change in the running characteristic eventually reflects all the intention of the driver and all the driving environment.

Further, in accordance with the invention, in order to stabilize the vehicle behavior during turning or improve the drivability during turning, in the case where the turning movement of the vehicle is detected, the revolution speed or gear ratio based on the indication SPI may be maintained, and further, in this case, even if the required revolution speed or required gear ratio determined on the basis of a driving requirement amount, such as an accelerator depression amount, changes, the revolution speed or gear ratio determined on the basis of the indication SPI may be maintained.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A control device for a vehicle that controls a revolution speed of a drive power source or a gear ratio of a transmission coupled to an output side of the drive power source in the vehicle equipped with the drive power source and the transmission, the control device being configured to:
   determine an index that is based on a running state of the vehicle, which is in accordance with driver's intention; and
   control a required revolution speed of the drive power source or a required gear ratio for the transmission based on the index, wherein:
   the index is increased when at least one of an obtained longitudinal vehicle acceleration value or an obtained transverse vehicle acceleration value, which are each repeatedly obtained during running of the vehicle, is larger than a previously obtained value, and the index is slowly decreased as compared to the index increased when the obtained value is smaller than the previously obtained value,
   the required revolution speed or the required gear ratio is established in advance according to a speed of the vehicle and the index,
   a required maximum acceleration ratio that is established in advance according to the index is determined based on the index, and a required acceleration for each vehicle speed is determined based on a maximum generated acceleration and the required maximum acceleration ratio for each vehicle speed, and
   the required revolution speed or the required gear ratio is set based on the required acceleration.

2. The control device according to claim 1, wherein a required maximum acceleration ratio that is established in advance according to the index is determined based on the index, and a required acceleration is determined based on a maximum generated acceleration and the required maximum acceleration ratio at a point in time at which the index is determined, and
   the required revolution speed or the required gear ratio is maintained at a value at which this required acceleration is attained.

3. The control device according to claim 1, wherein a required maximum acceleration ratio that is established in advance according to the index is determined based on the index, and
   when the index is larger than a predetermined value, a required acceleration is determined based on a maximum generated acceleration and the required maximum acceleration ratio at a point in time at which the index is determined, and the required revolution speed or the required gear ratio is maintained at a value at which this required acceleration is attained.

4. The control device according to claim 1, wherein a driving requirement amount for the vehicle is determined, and a target revolution speed of the drive power source or a target gear ratio of the transmission is further determined based on the driving requirement amount, and the drive power source is controlled to have either the required revolution speed or the target revolution speed whichever is higher, or the transmission is controlled to have either the required gear ratio or the target gear ratio whichever is higher.

5. The control device according to claim 4, wherein a variation rate of the revolution speed of the drive power source in a case in which the target revolution speed exceeds the required revolution speed, or a variation rate of the gear ratio in a case in which the target gear ratio exceeds the required gear ratio is made different depending on the index.

6. The control device according to claim 5, wherein when the index based on the running state of the vehicle is relatively large, the variation rate of the revolution speed or the variation rate of the gear ratio is higher than when the index is relatively small.

7. The control device according to claim 1, wherein when the vehicle turns, a variation of the required revolution speed or the required gear ratio is suppressed compared with a case in which the vehicle does not turn.

8. A control method for a vehicle for controlling a revolution speed of a drive power source or a gear ratio of a transmission coupled to an output side of the drive power source in the vehicle equipped with the drive power source and the transmission, the control method comprising:
   determining an index that is based on a running state of the vehicle with a control device,
   controlling a required revolution speed of the drive power source or a required gear ratio for the transmission based on the index, wherein the required revolution speed or the required gear ratio is established in advance according to a speed of the vehicle and the index,
   increasing the index when at least one of an obtained longitudinal vehicle acceleration value or an obtained transverse vehicle acceleration value, which are each repeatedly obtained during running of the vehicle, is larger than a previously obtained value, and decreasing the index as compared to the index increased when the obtained value is smaller than the previously obtained value,
   establishing a required maximum acceleration ratio in advance according to the index is determined based on the index, and determining a required acceleration for each vehicle speed based on a maximum generated acceleration and the required maximum acceleration ratio for each vehicle speed, and setting the required revolution speed or the required gear ratio based on the required acceleration.

9. The control device according to claim 1, wherein the control device is configured to control a required revolution speed of the drive power source based on the index.

* * * * *